(12) United States Patent
Li et al.

(10) Patent No.: US 10,887,311 B2
(45) Date of Patent: Jan. 5, 2021

(54) METHOD AND APPARATUS FOR REQUESTING USAGE PERMISSION, AND METHOD AND APPARATUS FOR ACQUIRING USAGE PERMISSION

(71) Applicant: Tencent Technology (Shenzhen) Company Limited, Shenzhen (CN)

(72) Inventors: Cong Li, Shenzhen (CN); Ying Lai, Shenzhen (CN); Jianbo Cao, Shenzhen (CN); Chuntao Xiao, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 348 days.

(21) Appl. No.: 16/138,561

(22) Filed: Sep. 21, 2018

(65) Prior Publication Data

US 2019/0028476 A1 Jan. 24, 2019

Related U.S. Application Data

(63) Continuation-in-part of application No. PCT/CN2017/080547, filed on Apr. 14, 2017.

(30) Foreign Application Priority Data

Apr. 15, 2016 (CN) .................... 2016 1 0239 6623

(51) Int. Cl.
*H04L 29/06* (2006.01)
*H04W 4/50* (2018.01)
*H04W 12/00* (2009.01)

(52) U.S. Cl.
CPC .......... *H04L 63/10* (2013.01); *H04L 63/0876* (2013.01); *H04W 4/50* (2018.02); *H04W 12/0023* (2019.01); *H04W 12/0027* (2019.01)

(58) Field of Classification Search
CPC ..... H04L 63/10; H04L 63/0876; H04L 67/06; H04L 67/16; H04L 67/20; H04L 67/26;
(Continued)

(56) References Cited

U.S. PATENT DOCUMENTS

| 2013/0324259 | A1  | 12/2013 | McCaffrey et al. |
| 2014/0025469 | A1* | 1/2014  | Mishuku ............ G06Q 30/0225 705/14.26 |

(Continued)

FOREIGN PATENT DOCUMENTS

| CN | 102541931 A | 7/2012 |
| CN | 103258281 A | 8/2013 |

(Continued)

OTHER PUBLICATIONS

Tencent Technology, ISRWO, PCTCN2017080547, Jun. 26, 2017, 8 pgs.
Tencent Technology, IPRP, PCTCN2017080547, Oct. 16, 2018, 6 pgs.

*Primary Examiner* — Nelson S. Giddins
(74) *Attorney, Agent, or Firm* — Morgan, Lewis & Bockius LLP

(57) ABSTRACT

The present disclosure discloses a method performed at a computer acting as a third-party system for requesting for a usage permission. The third-party system receives download information sent by means of a page of a first application, the download information at least including a download identifier, and the download identifier being used for indicating a first device identifier of a first device running the first application, a first account logging into the first application, and a second application identifier of a downloaded second application. After authenticating the download information, the third-party system requests a server of the first application to configure the usage permission for the first account
(Continued)

in response to an authentication result and return such configuration to the first application running at the first device.

20 Claims, 8 Drawing Sheets

(58) Field of Classification Search
CPC .. H04L 67/303; H04W 4/50; H04W 12/0027; H04W 12/0023; G06Q 20/127; G06Q 30/0208
See application file for complete search history.

(56) References Cited

U.S. PATENT DOCUMENTS

2015/0180851 A1* 6/2015 Zou ..................... H04L 9/3226
  726/4
2015/0302445 A1* 10/2015 Zhao ................. G06Q 30/0214
  705/14.16

FOREIGN PATENT DOCUMENTS

| CN | 103929444 A | 7/2014 |
| CN | 104867031 A | 8/2015 |
| CN | 104902019 A | 9/2015 |
| CN | 105187477 A | 12/2015 |
| CN | 105430101 A | 3/2016 |
| CN | 105812479 A | 7/2016 |

* cited by examiner

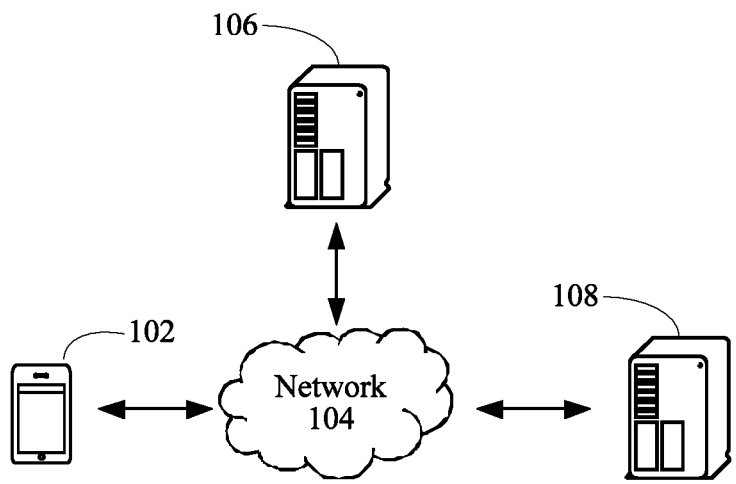

FIG. 1

A third-party system receives download information sent by means of a page of a first application, the download information at least including a download identifier, and the download identifier being used for indicating a first device identifier of a first device running the first application, a first account logging into the first application, and a second application identifier of a downloaded second application — S202

The third-party system authenticates the download information — S204

The third-party system requests a server of the first application to configure a usage permission for the first account in response to the authentication and and return such configuration to the first application running at the first device — S206

FIG. 2

METHOD AND APPARATUS FOR REQUESTING USAGE PERMISSION, AND METHOD AND APPARATUS FOR ACQUIRING USAGE PERMISSION

PRIORITY CLAIM AND RELATED APPLICATION

This application is a continuation-in-part application of PCT/CN2017/080547, entitled "REQUEST METHOD AND DEVICE FOR USAGE PERMISSION, AND ACQUISITION METHOD AND DEVICE FOR USAGE PERMISSION" filed on Apr. 14, 2017, which claims priority to Chinese Patent Application No. 201610239662.3, filed with the State Intellectual Property Office of the People's Republic of China on Apr. 15, 2016, and entitled "REQUEST METHOD AND APPARATUS FOR REQUESTING FOR USAGE PERMISSION, AND METHOD AND APPARATUS FOR ACQUIRING USAGE PERMISSION", all of which are incorporated herein by reference in their entirety.

FIELD OF THE TECHNOLOGY

The present disclosure relates to the field of computers, and specifically, to a method and apparatus for requesting for a usage permission, and a method and apparatus for acquiring a usage permission.

BACKGROUND OF THE DISCLOSURE

At present, most existing application distribution markets usually only provide downloading of software, and count a quantity of times an application is downloaded. For example, an application distribution market counts a quantity of downloads of a type of software within a period of time, and feeds back the quantity of downloads to a software developer or operator, and the software developer or operator evaluates the promotion capability of the application distribution market according to an evaluation result such as the quantity of downloads.

However, the software developer or operator can merely passively receive the result of the application distribution market and are not able to improve the download efficiency and usage efficiency of the software of the software developer or operator by interacting with an application distributor/promoter or user.

No effective resolution is provided with regard to the problem at present.

SUMMARY

Embodiments of the present disclosure provide a method and apparatus for requesting for a usage permission and a method and apparatus for acquiring a usage permission, so as to at least resolve the technical problem in the existing technology of incapability of requesting for configuring a usage permission for a first application due to incapability of acquiring the first application for downloading a second application.

An aspect of the embodiments of the present disclosure provides a method for requesting for a usage permission performed at a computer acting as a third-party system, the computer having one or more processors and memory storing a plurality of programs to be executed by the one or more processors, the method comprising: receiving, by a third-party system, download information sent by means of a page of a first application, the download information at least including a download identifier, and the download identifier being used for indicating a first device identifier of a first device running the first application, a first account logging into the first application, and a second application identifier of a downloaded second application; authenticating, by the third-party system, the download information; and requesting, by the third-party system, a server of the first application to configure the usage permission for the first account in response to an authentication result and return such configuration to the first application running at the first device.

Another aspect of the embodiments of the present disclosure further provides a computer acting as a third-party system for requesting for a usage permission, the computer having one or more processors, memory coupled to the one or more processors, and a plurality of programs stored in the memory that, when executed by the one or more processors, cause the third-party system to perform the aforementioned method for requesting for a usage permission.

Still another aspect of the embodiments of the present disclosure provides a non-transitory computer readable storage medium storing a plurality of programs in connection with a computer having one or more processors and acting as a third-party system for requesting for a usage permission, wherein the plurality of programs, when executed by the one or more processors, cause the third-party system to perform the aforementioned method for requesting for a usage permission.

In the embodiment of the present disclosure, a third-party system receives download information sent by means of a page of a first application, where the download information at least includes a first device identifier of a first device running the first application, a first account logging into the first application, and a second application identifier of a downloaded second application, authenticates the download information, and requests a server of the first application to configure a usage permission for the first account in response to an authentication result. That is, by acquiring the download information sent by means of the page of the first application, authenticating the download information, and then requesting for configuring the usage permission for the first account logging into the first application in response to the authentication, the first application requesting for downloading the second application is acquired by receiving and authenticating the download information. That is, a download source for downloading the second application is acquired from the third-party system, so as to perform a further subsequent operation on the first application as the download source. This embodiment provides a method for requesting, by the third-party system, for configuring the corresponding usage permission for the first account logging into the first application as the download source, so as to provide a corresponding excitation for the operation of downloading the second application by means of the first application. That is, a download port of the second application is provided in the first application, to expand a download channel for the second application, so as to further achieve the purpose of improving the download efficiency and usage efficiency of the second application. In addition, in this embodiment, the download source for downloading the second application can be acquired by acquiring the download information of the second application by means of the page of the first application, and by further requesting for configuring the corresponding usage permission for the first account logging into the first application as the download source, the problem in the existing technology of incapability of requesting for configuring the usage permission for the first application due to incapability of acquiring the first application for downloading the second application can be further overcome.

BRIEF DESCRIPTION OF THE DRAWINGS

Accompanying drawings described herein are used to provide further understanding about the embodiments of the present disclosure, and constitute one portion of this application; and schematic embodiments of the present disclosure and their description are used to explain the embodiments of the present disclosure, and do not constitute an inappropriate limit on the embodiments of the present disclosure. In the figures:

FIG. 1 is a schematic diagram of an application environment of an optional method for requesting for a usage permission according to an embodiment of the present disclosure;

FIG. 2 is a flowchart of an optional method for requesting for a usage permission according to an embodiment of the present disclosure;

DESCRIPTION OF EMBODIMENTS

Figure 3:
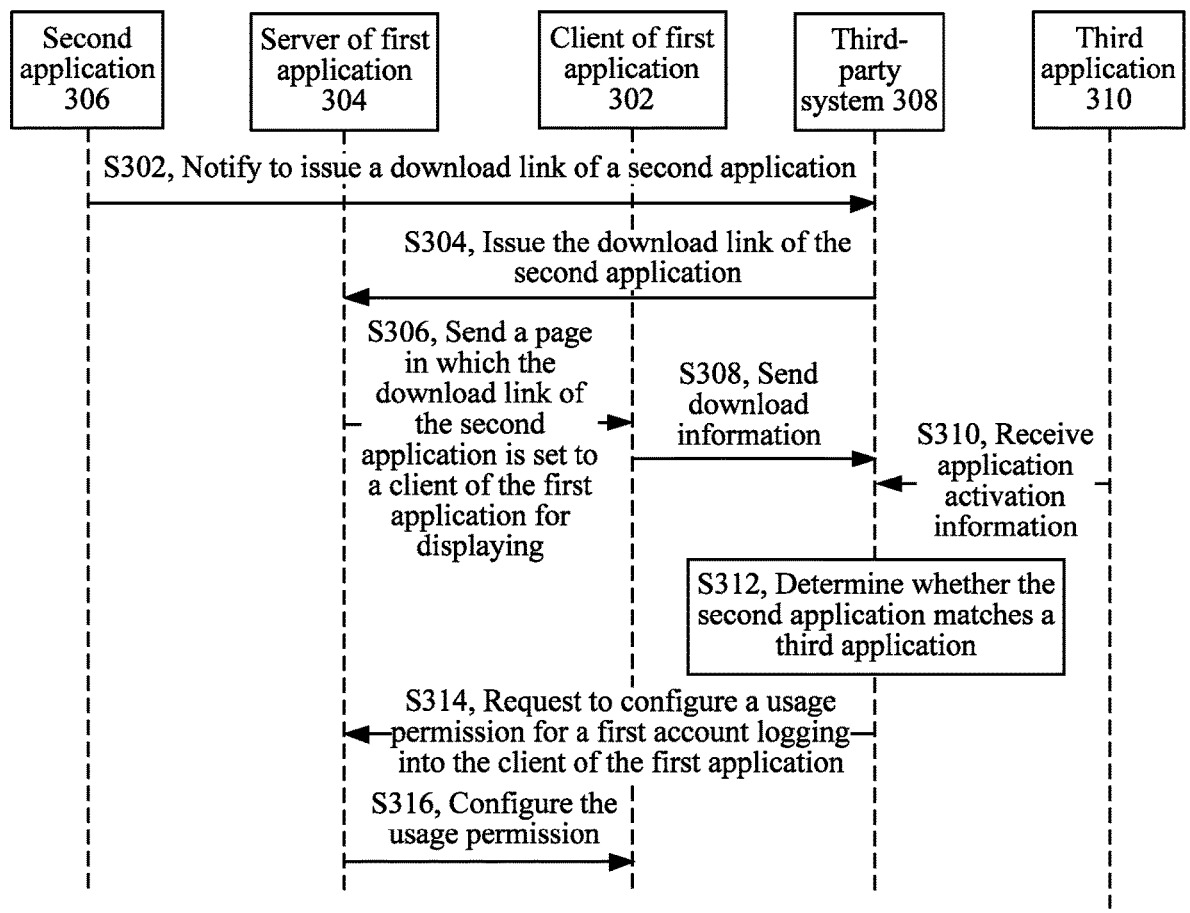
FIG. 3 is a flowchart of another optional method for requesting for a usage permission according to an embodiment of the present disclosure.

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that, the terms "first" and "second" in the description, the claims, and the accompanying drawings of the present disclosure are merely used for distinguishing similar targets, and are not used for describing a specific sequence or order. It should be understood that, data used in this way can be interchanged in an appropriate case, so that the embodiments of the present disclosure that are described herein can be implemented in a sequence other than those sequences illustrated or described herein. Moreover, the terms "include", "comprise", and any variants thereof are intended to cover a non-exclusive inclusion. For example, in the context of a process, method, system, product, or device that includes a series of steps or units not only include such steps or units that are specified clearly, but also include other steps or units that are not specified clearly or are inherent to the process, method, product, or device.

Embodiment 1

According to the embodiments of the present disclosure, an embodiment of a method for requesting for a usage permission is provided. The method for requesting for a usage permission may be used in but not limited to the application environment shown in FIG. 1. A server 106 where a third-party system is located receives, through a network 104, download information sent by means of a page of a first application. The first application is run on a first device (a terminal 102 shown in FIG. 1). The download information includes at least a first device identifier of the first device (the terminal 102 shown in FIG. 1), a first account logging into the first application, and a second application identifier of a downloaded second application. Then, the server 106 where the third-party system is located authenticates the download information, and requests a server 108 of the first application to configure a usage permission for the first account logging into the first application in response to an authentication result.

Optionally, in this embodiment, the terminal may include but is not limited to at least one of the following: a mobile phone, a tablet computer, a notebook computer, or a desk PC. The above description is merely for exemplary, which is not limited in this embodiment. Optionally, in this embodiment, the network may include but is not limited to at least one of the following: a wide area network, a metropolitan area network, or a local area network. The above description is merely for exemplary, which is not limited in this embodiment.

According to the embodiments of the present disclosure, a method for requesting for a usage permission is provided. As shown in FIG. 2, the method includes:

S202: A third-party system receives download information sent by means of a page of a first application, the download information at least including a download identifier, and the download identifier being used for indicating a first device identifier of a first device running the first application, a first account logging into the first application, and a second application identifier of a downloaded second application.

S204: The third-party system authenticates the download information.

S206: The third-party system requests a server of the first application to configure a usage permission for the first account in response to an authentication result.

Optionally, in this embodiment, the method for requesting for a usage permission may be used in but not limited to the process of requesting, by the third-party system, for a usage permission for applications of different application types. For example, the applications may be but not limited to a music application, a video application, a communication application, and the like. Optionally, in this embodiment, the third-party system is a third-party platform system relative to a user of the first device, an issuer or operator of the first application, and a source issuer or operator of the second application, and is a main body configured to configure information for the second application. For example, an advertisement platform system for advertising or a promotion platform system for promoting may advertise or promote application including the second application. Description is provided by an example of requesting for a usage permission in a music application, that is, by an example in which the first application is a music application and the second application is a game application. The third-party system receives download information sent by means of a page of the music application, where the download information includes at least: a first device identifier (for example, an ID_A) of the first device (for example, a terminal A) running the music application, a first account (for example, an ID_01) logging into the music application, and an application identifier (for example, an ID-x) of the downloaded game application, and then the third-party system authenticates the download information, and requests the server of the first application to configure the usage permission for the first account (for example, the ID_01) in response to the authentication. The above description is merely for exemplary, which is not limited in this embodiment.

It should be noted that, in this embodiment, the third-party system receives the download information sent by means of the page of the first application, where the download information includes at least the first device identifier of the first device running the first application, the first account logging into the first application, and the second application identifier of the downloaded second application, authenticates the download information, and requests the server of the first application to configure the usage permission for the first account in response to the authentication result. That is, after acquiring the download information sent by the page and authenticating the download information, the usage permission is configured for the first account logging into the first application in response to the authentication result. That is, a download source for downloading the second application is acquired from the third-party system, so as to perform a further subsequent operation on the first application as the download source. This embodiment provides a method for requesting, by the third-party system, for configuring the corresponding usage permission for the first account logging into the first application as the download source, so as to provide a corresponding excitation for the operation of downloading the second application by means of the first application. That is, a download port of the second application is provided in the first application, to expand a download channel for the second application, so as to further achieve the purpose of improving the download efficiency and usage efficiency of the second application.

Optionally, in this embodiment, the third-party system may request, when acquiring the authenticated download information, the server of the first application to configure the usage permission for the first account logging into the first application. The authentication manner may include but is not limited to: determining whether the downloaded application is activated. This embodiment is not limited to this authentication manner, but may further include other authentication manners used for indicating that this download is a valid operation, for example, determining whether the downloaded application is run, or the like. Further, the authentication process may include but is not limited to: determining whether the device identifier of the downloaded application matches the device identifier of the activated application, and determining whether the application identifier of the downloaded application matches the application identifier of the activated application. The description herein is merely for exemplary, which is not limited in this embodiment.

Optionally, in this embodiment, the authenticating, by the third-party system, the download information includes: receiving, by the third-party system, application activation information, where the application activation information at least includes a third application identifier used for indicating an activated third application and a second device identifier of a second device, where the third application is run on the second device; and determining whether the second device identifier matches the first device identifier and whether the second application identifier matches the third application identifier.

The requesting, by the third-party system, a server of the first application to configure a usage permission for the first account in response to an authentication result includes: requesting, by the third-party system, the server of the first application to configure the usage permission for the first account if the second device identifier matches the first device identifier and the second application identifier matches the third application identifier.

For example, description is provided by an example of requesting for a usage permission in a music application, that is, by an example in which the first application is a music application and the second application and the third application are game applications. The third-party system receives download information sent by means of a page of the music application, where the download information includes at least: a first device identifier (for example, an ID_A) of the first device (for example, a terminal A) running the music application, a first account (for example, an ID_01) logging into the music application, and an application identifier (for example, an ID-x) of the downloaded game application. The third-party system receives an application identifier (for example, an ID-y) used for indicating an activated game application and a second device identifier (for example, an ID_B) of the second device (for example, a terminal B) in which the activated game application is installed. The third-party system determines whether the second device identifier (for example, the ID_B) matches the first device identifier (for example, the ID_A) and whether the application identifier (for example, the ID-x) of the downloaded game application matches the application identifier (for example, the ID-y) of the activated game application. If the second device identifier (for example, the ID_B) matches the first device identifier (for example, the ID_A) and the application identifier (for example, the ID-x) of the downloaded game application matches the application identifier (for example, the ID-y) of the activated game application, the third-party system requests the server of the music application to configure the usage permission for the first account (for example, the ID_01). The above description is merely for exemplary, which is not limited in this embodiment.

Optionally, in this embodiment, before the receiving, by the third-party system, the download information sent by the page, the method further includes: issuing, by the third-party system, a download link of the second application to the first application by means of the server.

It should be noted that, in this embodiment, the second application may entrust, but not limited to, a downloading permission to the third-party system, so that the third-party system issues the download link of the second application to the first application by means of the server of the first application. That is, the third-party system as the third-party platform separately interacts with the first application and the second application, so as to configure the usage permission for the first account logging into the first application, thereby reducing interaction operations of the second application and improving the issuing efficiency of the download link of the second application.

Optionally, in this embodiment, the issuing, by the third-party system, a download link of the second application to the first application by means of the server of the first application may include but is not limited to: determining whether the first account logging into the first application is a predetermined account, where the corresponding usage permission is configured for the predetermined account; and issuing the download link of the second application to the first application when determining that the first account is not the predetermined account. That is, by determining whether the first account is the predetermined account for which the corresponding permission is configured, whether to issue the download link of the second application is determined, to ensure the validity of issuing of the download link of the second application, so as to avoid resource waste caused by unnecessary issuing.

Optionally, in this embodiment, the download information may be first sent to the server of the first application by the first application, and then sent to the third-party system by the server of the first application, or may be directly sent to the third-party system. This is not limited in this embodiment.

Optionally, in this embodiment, before the receiving, by the third-party system, the download information sent by the page, or after the requesting, by the third-party system, the server of the first application to configure the usage permission for the first account, the method further includes: transferring, by the third-party system, a resource corresponding to the usage permission to the server.

Optionally, in this embodiment, there is a predetermined association relationship between the usage permission configured for the first account and the resource transferred by the third-party system. Different degrees of usage permissions are configured corresponding to different degrees of transferred resources. For example, the resource is asset, and the usage permission is a quantity of days for which a membership permission is granted. Assume that the asset transferred by the third-party system to the server of the first application is K1, the usage permission configured for the first account logging into the first application by the server of the first application is N1 days for which the membership permission is granted. Still for example, assuming that the asset transferred by the third-party system to the server of the first application is K2, the usage permission configured for the first account logging into the first application by the server of the first application is N2 days for which the membership permission is granted. If K2>K1, N2>N1.

Optionally, in this embodiment, the resource corresponding to the usage permission may be, but not limited to, transferred by the server of the second application to the third-party system. That is, when configuring the usage permission for the first account, the first account logging into the first application does not need to pay any price, and by downloading the second application, the server of the second application transfers the corresponding resource to the usage permission configured for the first account. Therefore, the download volume and/or activation volume of the second application can be increased while reducing use costs needed for configuring the usage permission for the first account logging into the first application and enabling the second application to transfer a resource, so that the second application provides a corresponding excitation for a download operation of the first application, to further achieve the purpose of improving the download efficiency and usage efficiency of the second application.

Specific description is provided in combination with the following example. In step S302 to step S316 as shown in FIG. 3, a second application 306 notifies a third-party system 308 to issue a download link of the second application. After receiving the entrustment, the third-party system 308 issues the download link of the second application to a server 304 of a first application, so that the server 304 of the first application sends a page in which the download link of the second application is set to a client 302 of the first application for displaying. When receiving a download request in the process of displaying the page, the client 302 of the first application sends download information to the third-party system 308. Then, the third-party system 308 receives application activation information about that a third application 310 is activated, and determines, according to the received download information and application activation information, whether the second application matches the third application. If it is determined that the second application matches the third application, the third-party system 308 requests the server 304 of the first application to configure a usage permission for a first account logging into the client 302 of the first application. The server 304 of the first application configures the corresponding usage permission for the first account logging into the client 302 of the first application.

By the embodiment provided in this application, by acquiring the download information sent by means of the page of the first application, authenticating the download information, and then requesting for configuring the usage permission for the first account logging into the first application in response to the authentication, the first application requesting for downloading the second application is acquired by receiving and authenticating the download information. That is, a download source for downloading the second application is acquired from the third-party system, so as to perform a further subsequent operation on the first application as the download source. This embodiment provides a method for requesting, by the third-party system, for configuring the corresponding usage permission for the first account logging into the first application as the download source, so as to provide a corresponding excitation for the downloading operation of downloading the second application by means of the first application. That is, a download port of the second application is provided in the first application, to expand a download channel for the second application, so as to further achieve the purpose of improving the download efficiency and usage efficiency of the second application. In addition, in this embodiment, the download source for downloading the second application can be acquired by acquiring the download information of the second application by means of the page of the first application, and by further requesting for configuring the corresponding usage permission for the first account logging into the first application as the download source, the problem in the existing technology of incapability of requesting for configuring the usage permission for the first application due to incapability of acquiring the first application for downloading the second application can be further overcome.

As an optional solution, before the receiving, by the third-party system, the download information sent by means of the page of the first application, the method further includes:

S1: The third-party system issues a download link of the second application to the first application by means of the server.

It should be noted that, in this embodiment, the second application may entrust, but not limited to, a downloading permission to the third-party system. That is, the third-party system issues the download link of the second application to the first application by means of the server of the first application by notifying the third-party system to issue the download link of the second application. That is, the third-party system as the third-party platform separately interacts with the first application and the second application, to issue the download link of the second application to a plurality of first applications, so as to configure corresponding usage permissions for accounts logging into the different first applications, without separate interactions between the second application and the different first applications, thereby reducing interaction operations of the second application and improving the issuing efficiency of the download link of the second application.

Optionally, in this embodiment, the issuing, by the third-party system, a download link of the second application to the first application by means of the server of the first application may include but is not limited to: determining whether the first account logging into the first application is a predetermined account, where the corresponding usage permission is configured for the predetermined account; and issuing the download link of the second application to the first application when determining that the first account is not the predetermined account. That is, by determining whether the first account is the predetermined account for which the corresponding permission is configured, whether to issue the download link of the second application is determined, to ensure the validity of issuing of the download link of the second application, so as to further avoid resource waste caused by unnecessary issuing.

Optionally, in this embodiment, the issuing, by the third-party system, a download link of the second application to the first application by means of the server includes: setting, by the third-party system, the download link of the second application in the page loaded by the first application by means of the server, and sending an address of the page to the first application by means of the server of the first application.

Figure 4:
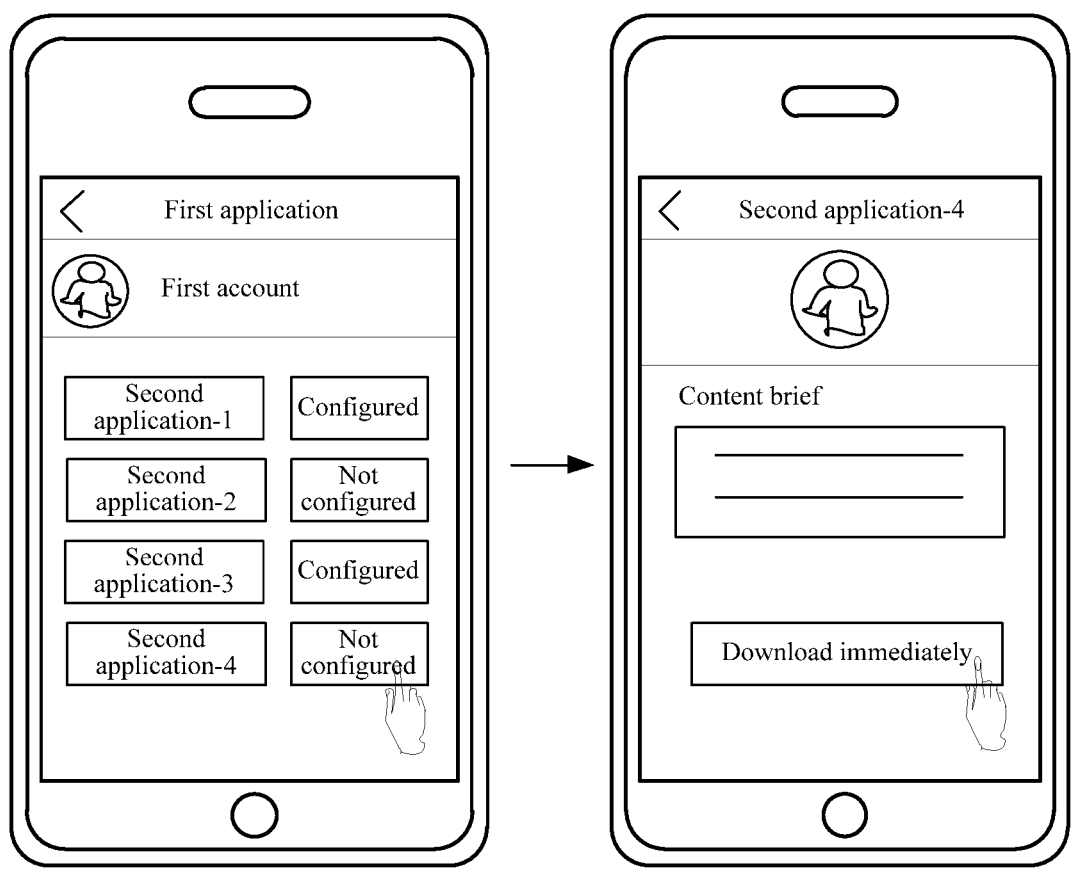
FIG. 4 is a schematic diagram of an optional method for requesting for a usage permission according to an embodiment of the present disclosure.

Specific description is provided in combination with the example shown in FIG. 4. Assume that the third-party system issues download links of four second applications (as shown in the left side of FIG. 4) on the page loaded by the client of the first application, for example, respectively, a second application-1, a second application-2, a second application-3, and a second application-4. Corresponding usage permissions are configured for the second application-1 and the second application-3, and no corresponding usage permissions are configured for the second application-2 and the second application-4. Further, as shown in FIG. 4, assuming that a download operation instruction for downloading the second application-4 is received, the method may include but is not limited to jumping to a download page (as shown in the right side of FIG. 4), clicking on "Download immediately" for downloading the second application-4 which has been issued on the client of the first application but through which configuration of the usage permission for the first account has not been performed. Therefore, configuration of the usage permission for the first account logging into the client of the first application is implemented by downloading the second application-4. The above description is merely for exemplary, and the download operation may be, but not limited to, executed directly as shown in the left side of FIG. 4, which is not limited in this embodiment.

By the embodiment of the present disclosure, the third-party system issues the download link of the second application to the first application by means of the server, so as to increase the download volume of the second application by requesting for downloading the second application in the first application, to further achieve the purpose of improving the download efficiency and usage efficiency of the second application. Further, in this embodiment, by determining whether the first account is the predetermined account for which the corresponding usage permission is configured, whether to issue the download link of the second application is further determined, to ensure the validity of issuing, so as to avoid resource waste caused by unnecessary issuing.

As an optional solution, the issuing, by the third-party system, a download link of the second application to the first application by means of the server includes:

S1: The third-party system sets the download link of the second application in the page by means of the server, and sends an address of the page to the first application by means of the server.

Optionally, in this embodiment, the download link of the second application set in the page may be displayed as a download button, or may also be displayed as a download link. For example, the "Not configured" shown in the left side of FIG. 4 may be used as a download button for instructing to download the second application. That is, the second application may be downloaded directly by clicking on the "Not configured". Still for example, the "Not configured" shown in the left side of FIG. 4 may be used as a download link for linking to a download interface of the second application. That is, download is performed by clicking on the "Not configured" to jump to the download interface shown in the right side of FIG. 4. This is not limited in this embodiment.

Specific description is provided in combination with the following example. After receiving the entrustment of the second application-4, the third-party system sets the download link of the second application-4 in the page as shown in the left side of FIG. 4 by means of the server of the first application and sends an address of the page to the client of the first application for displaying, for example, the interface shown in the left side of FIG. 4.

By the embodiment provided in this application, the third-party system sets the download link of the second application in the page by means of the server and sends the address of the page to the first application by means of the server, so that the first application may display the download link of the second application, to increase the download volume of the second application by means of an expanded download channel of the second application, so as to further achieve the purpose of improving the download efficiency and usage efficiency of the second application.

As an optional solution, the download information includes: a first device identifier, a second application identifier, and a download identifier, where the download identifier is obtained by encoding the first account, the first device identifier, and the second application identifier. For example, the download information may include but is not limited to the information shown in table 1:

TABLE 1

First account ID logging into first application
First application ID
First device ID
National information
First device type
First device language
Second application ID Optionally, in this embodiment, the download identifier may be, but not limited to, acquired according to the md5 encoding technology. For example, download identifier=md5 (first account, first device identifier, and second application identifier). The description is merely for exemplary, and the download identifier may also be acquired in other manners in this embodiment, which is not limited in this embodiment.

For example, the acquired download information is as follows:
First account: 100011865
Second application ID: 5619138040d4ec4ca3ebafec
First device ID: 7932c16a45db8d74.
By means of the md5 encoding technology, it can be obtained that the download identifier is:
f39253a094e9f00e388ad0a60ae24af6.

By the embodiment provided in this application, the download information sent by the page and received by the third-party system may include the first device identifier, the second application identifier, and the download identifier, where the download identifier may be, but not limited to, obtained by means of the md5 encoding technology. Therefore, the usage permission configured for the first account logging into the first application is acquired by using the download information.

As an optional solution, before the receiving, by the third-party system, the download information sent by means of the page of the first application, or after the requesting, by the third-party system, the server of the first application to configure the usage permission for the first account, the method further includes: transferring, by the third-party system, a resource corresponding to the second application to the server.

Optionally, in this embodiment, the transferring, by the third-party system, a resource corresponding to the second application to the server includes: transferring, by the third-party system, a fee corresponding to a quantity of times for which the second application is downloaded and/or activated to the server; and/or transferring, by the third-party system, a fee corresponding to the usage permission to the server.

That is, there is a predetermined association relationship between the usage permission configured for the first account and the resource transferred by the third-party system and/or the quantity of times for which the second application is downloaded and/or activated. The resource may be but not limited to the fee. The resource corresponding to the usage permission may be, but not limited to, transferred by the server of the second application to the third-party system. That is, when configuring the usage permission for the first account, the first account logging into the first application does not need to pay any price, and by downloading and activating the second application, the server of the second application transfers the corresponding resource (for example, the fee) to the usage permission configured for the first account.

It should be noted that, the server of the second application may transfer, in advance, all resources corresponding to a predetermined quantity of times for which the second application is downloaded and/or activated to the third-party system, or may also transfer a corresponding resource to the third-party system once each time when it is determined that the second application is downloaded and/or activated. The time point for transferring the resource of the second application is not limited in this embodiment. In addition, in this embodiment, the third-party system may also transfer the fee corresponding to the usage permission to the server of the first application.

Optionally, in this embodiment, the third-party system may also issue, but not limited to, download links to the server of the first application for a plurality of different second applications.

Optionally, in this embodiment, only downloading the second application, only authenticating (for example, activating) the second application, or downloading and authenticating (for example, activating) the second application may be but not limited to configured with different degrees of usage permissions. For example, assuming that the usage permission is a quantity of days for which the membership permission is granted (for example, upgrading the first account to a VIP account), in a case of only downloading the second application, the usage permission may be configured as using for one day, and in a case of downloading and authenticating (for example, activating) the second application, the usage permission may be configured as using for three days. The description herein is merely for exemplary, which is not limited in this embodiment.

Optionally, in this embodiment, when the second application provides resources of different degrees to the third-party system, the third-party system also transfers resources of different degrees to the server of the first application. The server of the first application may configure, but not limited to, usage permissions of different degrees for the first account. For example, for an operation of being downloaded and/or activated once, if the resource transferred by the second application-1 to the third-party system is K1 (that is, for an operation of being downloaded and/or activated once, the resource correspondingly transferred by the third-party system to the server of the first application is K1), the resource transferred by the second application-2 is K2 (that is, for an operation of being downloaded and/or activated once, the resource correspondingly transferred by the third-party system to the server of the first application is K2), where K1>K2, a usage permission Q1 configured by the server of the first application for the first account according to the operation that the second application-1 is downloaded and/or activated is greater than a usage permission Q2 configured by the server of the first application for the first account according to the operation that the second application-2 is downloaded and/or activated. Herein, Q1>Q2 may be understood as a quantity of the configured usage permission Q1 is greater than that of the configured usage permission Q2, for example, the quantity of days for which the membership permission is granted, or may also be understood as that a permission grade of the configured usage permission Q1 is higher than that of the configured usage permission Q2, for example, whether the permission grade is a golden member or a common member. The above description is merely for exemplary, which is not limited in this embodiment.

Figure 5:
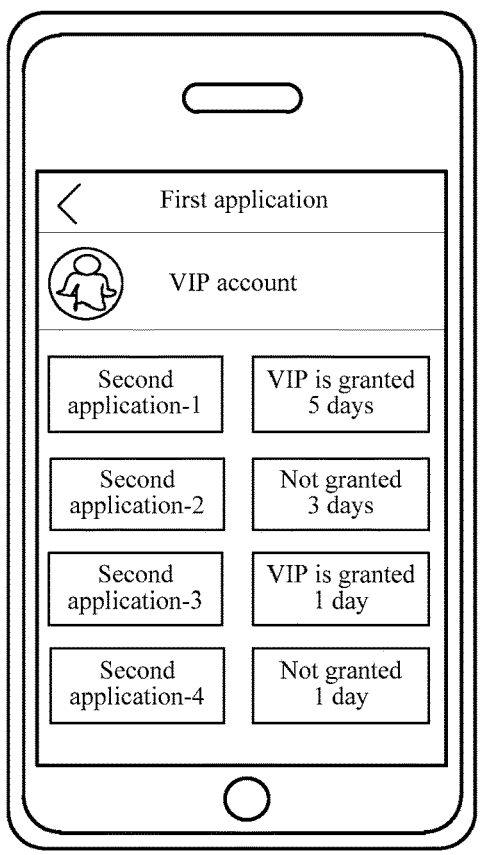
FIG. 5 is a flowchart of another optional method for requesting for a usage permission according to an embodiment of the present disclosure.

For example, the resource is an asset, and the usage permission is a quantity of days for which the membership permission is granted (for example, upgrading the first account to a VIP account). Assume that the third-party system issues download links of four second applications (as shown in FIG. 5) on the page of the first application, for example, respectively a second application-1, a second application-2, a second application-3, and a second application-4. Corresponding usage permissions are configured for the second application-1 and the second application-3, and no corresponding usage permissions are configured for the second application-2 and the second application-4.

Further, description is provided by an example of the second application-1 and the second application-3 for which the usage permissions have been configured. Assume that the second application-1 and the third-party system agree on transferring an asset of 50,000 yuan each time when the second application-1 is downloaded and activated, and the second application-3 and the third-party system agree on transferring an asset of 10,000 yuan each time when the second application-1 is downloaded and activated. As shown in FIG. 5, when the second application-1 is downloaded and activated, the third-party system may transfer the corresponding 50,000 yuan to the server of the first application, and the server of the first application may configure, according to the transferred asset, the usage permission as follows: granting the membership permission for five days for the first account (for example, upgrading the first account to a VIP account). When the second application-3 is downloaded and activated, the third-party system may transfer the corresponding 10,000 yuan to the server of the first application, and the server of the first application may configure, according to the transferred asset, the usage permission as follows: granting the membership permission for one day for the first account (for example, upgrading the first account to a VIP account).

Optionally, in this embodiment, the position of the download link of the second application in the displayed list may be configured, but not limited to, according to the transferred resources of different degrees. For example, a large quantity of the transferred resources indicates a front download position of the download link of the second application. This is not limited in this embodiment.

By the embodiment provided in this application, before the receiving, by the third-party system, the download information sent by means of the page of the first application, or after the requesting, by the third-party system, the server of the first application to configure the usage permission for the first account, the third-party system transfers the resource corresponding to the second application to the server. Therefore, the server of the second application transfers the corresponding resource to the usage permission configured for the first account when the third-party system acquires the second application downloaded and/or authenticated in the first application, to provide a corresponding excitation for a download operation of the first application while reducing use costs needed for configuring the usage permission for the first account logging into the first application and enabling the second application to transfer a resource, so as to expand the download channel of the second application and to further achieve the purpose of improving the download efficiency and usage efficiency of the second application.

Figure 6:
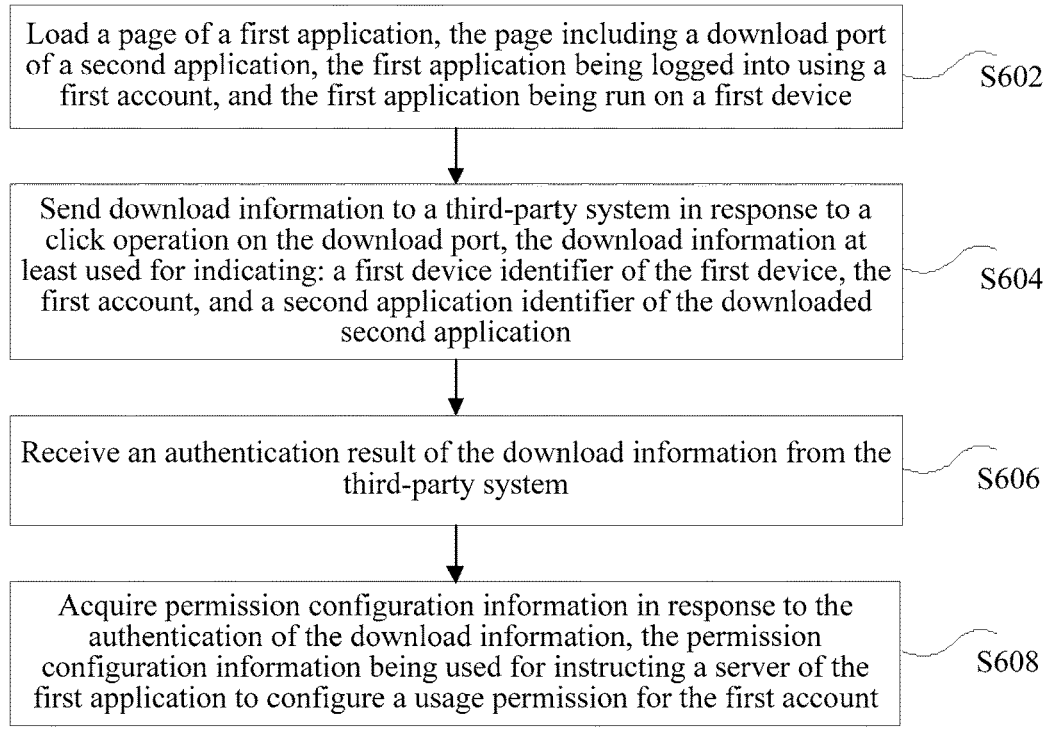
FIG. 6 is a flowchart of still another optional method for acquiring a usage permission according to an embodiment of the present disclosure.

According to the embodiments of the present disclosure, a method for acquiring a usage permission is further provided. As shown in FIG. 6, the method includes:

S602: Load a page of a first application, the page including a download port of a second application, the first application being logged into using a first account, and the first application being run on a first device.

S604: Send download information to a third-party system in response to a click operation on the download port, the download information at least including a download identifier, and the download identifier being used for indicating a first device identifier of the first device, the first account, and a second application identifier of the downloaded second application.

S606: Receive an authentication result of the download information from the third-party system.

S608: Acquire permission configuration information in response to the authentication result of the download information, the permission configuration information being used for instructing a server of the first application to configure a usage permission for the first account.

Optionally, in this embodiment, the method for acquiring a usage permission may be used in, but not limited to, the process of acquiring a usage permission for applications of different types. For example, the applications may be but not limited to a music application, a video application, a communication application, and the like. The method may be applied to an application client, or may also be directly applied to an H5 page, which is not limited in this embodiment.

For example, description is provided by an example of acquiring a usage permission in a music application, that is, by an example in which the first application is a music application and the second application is a game application. Assume that the music application is run on the first device (for example, a terminal A) and is logged in using the first account (for example, an ID_01). A page of the music application is loaded, where the page includes the download port of the second application. The music application sends download information to the third-party system in response to a click operation on the download port, where the download information includes at least: a first device identifier (for example, an ID_A) of the first device (for example, the terminal A), a first account (for example, the ID_01) logging into the music application, and a second application identifier (for example, an ID-y) of the downloaded game application, and then acquires permission configuration information in response to the authentication of the download information by the third-party system, where the permission configuration information is used for instructing the server of the first application to configure the usage permission for the first account (for example, the ID_01).

It should be noted that, in this embodiment, the page of the first application into which the first account is logged is loaded, the page including the download port of the second application, and the first application being run on the first device; the download information is sent to the third-party system in response to the click operation on the download port, and the download information is sent to the third-party system by means of the page, download information at least including a download identifier, and the download identifier being used for indicating the first device identifier of the first device, the first account, and the second application identifier of the downloaded second application; the authentication result of the download information is received from the third-party system; and the permission configuration information is acquired in response to the authentication result of the download information, the permission configuration information being used for instructing the server of the first application to configure the usage permission for the first account. That is, by loading the page of the first application including the download port of the second application, the third-party system can learn of, after learning of that the second application is downloaded, that it is the first application that executes the download operation, so as to configure the usage permission for the first account logging into the first account, and enable the first account to acquire the corresponding usage permission. That is, the third-party system configures the corresponding usage permission for the first account logging into the first application as the download source, so as to provide a corresponding excitation for the operation of downloading the second application by means of the first application. That is, a download port of the second application is provided in the first application, to expand a download channel for the second application, so as to further achieve the purpose of improving the download efficiency and usage efficiency of the second application.

Optionally, in this embodiment, operations performed by the server of the first application may include but are not limited to: determining whether the first account is a predetermined account, where the corresponding usage permission is configured for the predetermined account; and sending an address of the page in which the download link of the second application is set when determining that the first account is not the predetermined account. That is, the server of the first application determines whether the first account is the predetermined account for which the corresponding permission is configured, so as to determine whether to send the address of the page in which the download link of the second application is set, to ensure the validity of issuing of the download link of the second application, so as to avoid resource waste caused by unnecessary issuing.

Optionally, in this embodiment, after transferring the resource corresponding to the usage permission to the server of the first application, the third-party system may further but not limited to update and display the acquired usage permission.

By the embodiment provided in this application, by loading the page of the first application including the download port of the second application, the third-party system can learn of, after learning of that the second application is downloaded, that it is the first application that executes the download operation, so as to configure the usage permission for the first account logging into the first account, and enable the first account to acquire the corresponding usage permission. That is, the third-party system configures the corresponding usage permission for the first account logging into the first application as the download source, so as to provide a corresponding excitation for the operation of downloading the second application by means of the first application. That is, a download port of the second application is provided in the first application, to expand a download channel for the second application, so as to further achieve the purpose of improving the download efficiency and usage efficiency of the second application.

As an optional solution, before the loading a page of a first application, the method further includes:

S1: Receive a page loading instruction.
S2: Send a page loading request to the server.
S3: Acquire the page from the server.

By the embodiment provided in this application, after receiving the page loading instruction, the page loading request may be sent to the server of the first application, so as to acquire the page in which the download link of the second application is set from the server of the first application, thereby flexibly displaying the download link of the second application to be downloaded by loading the page, increasing the download volume of the second application by expanding a download channel of the second application, and further improving the download efficiency and usage efficiency of the second application.

As an optional solution, the page loading request carries the first account, where the acquiring the page from the server includes: acquiring the page from the server when the first account does not have the usage permission.

Optionally, in this embodiment, if the first account has the usage permission, another page is acquired from the server after sending the page loading request to the server.

By the embodiment of this application, instead of uniform loading, whether to load the page in which the download link of the second application is set can be further determined according to whether the first account has the usage permission, to further ensure the validity of issuing of the download link of the second application, so as to avoid resource waste caused by unnecessary issuing.

Figure 7:
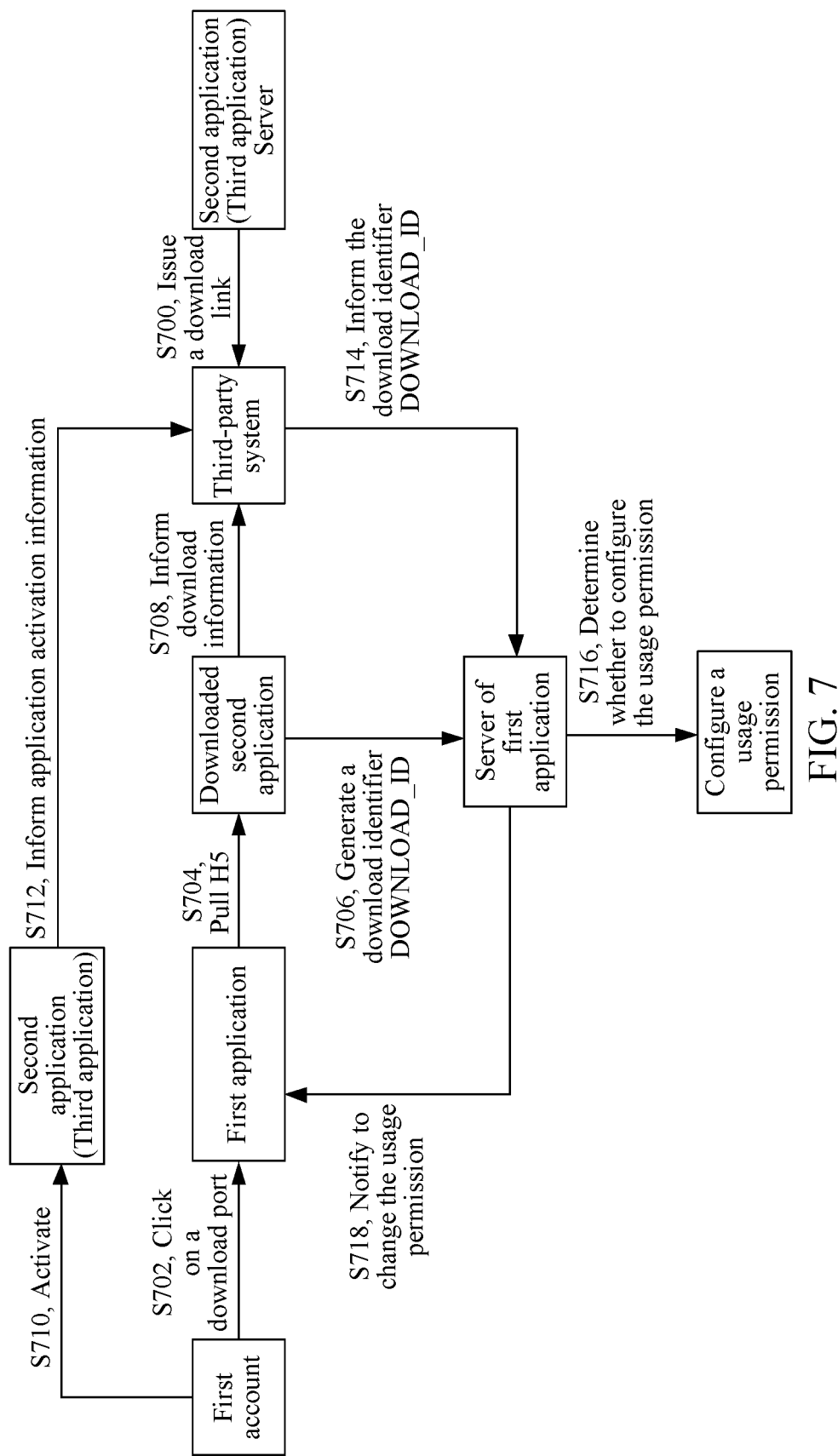
FIG. 7 is a flowchart of an optional method for requesting for and acquiring a usage permission according to an embodiment of the present disclosure.

The method for requesting for a usage permission is specifically described in combination with the example shown in FIG. 7:

S700: The second application (that is, an application matching the third application) issues a download link to the third-party system.

S702: A user clicks on the download port in the client of the first application into which the first account is logged. For example, description is provided by an example in which the first application is a music application, the download port may be but not limited to an interface of "VIP center" in the music application.

S704: The first application pulls an H5 page. For example, the H5 page may include but is not limited to an interface in which the download link of the second application is set. That is, if the H5 page is jumped to and some information of the download information is carried during the jump. The first device needs to agree with an H5 system on a fixed jumping address, to weaken coupling between the first device and H5. The carried some information of the download information includes: the first application identifier, the first account, the national information, the first device type, the first device identifier, the terminal language, and the second application identifier.

S706: The server of the first application encode, but not limited to, the acquired first account, first device identifier, and second application identifier, to generate a download identifier (for example, indicated as a DOWNLOAD_ID) in the download information. That is, when clicking on the download link in the H5 page, the H5 page sends some information of the download information to the server of the first application, and the server of the first application encodes the information to generate the download identifier. The download identifier and some other information of the download information uploaded by the H5 page are stored in the server of the first application.

S708: Inform the third-party system of the download information. The step is performed by means of a public network Http interface, for example. The third-party system may but not limited to identify, according to the download information, the application activation information received subsequently. Herein, the page does not need to store the download identifier after exiting the H5 page.

S710: Activate the second application (that is, the application matching the third application).

S712: Inform the third-party system of the application activation information, so that the third-party system performs match determining on the download information and the application activation information, so as to determine whether a current download operation is valid.

S714: The third-party system sends the download identifier to the server of the first application when determining that three is download and activation, that is, when the download is valid. For example, the download identifier is sent actively by means of a public network http interface. Herein, the download identifier is used for indicating the second application (that is, the third application) that is downloaded validly, so that the server of the first application determines whether to configure the usage permission for the client of the first application.

S716: The server of the first application determines, according to the download identifier, whether to configure the usage permission. For example, if the usage permission is configured for the first account, configuration of the usage permission for the account again is rejected in this step. For example, whether to grant the membership permission for the first account (for example, upgrading the first account to a VIP account) is determined according to the download identifier, and the quantity of days to be configured is further determined when it is determined that the configuration is needed.

S718: Notify the client of the first application to change the configured usage permission. That is, the information about the usage permission displayed by the client of the first application is updated.

It should be noted that, in this embodiment, the method for pulling the H5 page may also be expressed as loading the H5 page. Change and upgrade of the H5 page is implemented in the server of the first application only, without adjustment in the first device where the client of the first application is located, so as to ensure that adjustment of a download mode does not influence the device.

It should be noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also know that all the embodiments described in this specification are preferred embodiments, and the related actions and modules are not necessarily required in the present disclosure.

Through the descriptions of the preceding embodiments, a person skilled in the art may understand that the methods according to the foregoing embodiments may be implemented by hardware only or by software and a necessary universal hardware platform. However, in most cases, using software and a necessary universal hardware platform are preferred. Based on such an understanding, the technical solutions of the present disclosure essentially, or the part contributing to the prior art may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of the present disclosure.

Embodiment 2

The application environment of the embodiment of the present disclosure may refer but not limited to the application environment in Embodiment 1, which is not described in detail in this embodiment. The embodiment of the present disclosure provides a specific example of application scenario for implementing the method for requesting for a usage permission and the method for acquiring the usage permission.

As an optional embodiment, description is provided by an example of requesting for configuring a usage permission in a music application by downloading a game application in the music application. That is, assume that the first application is a music application, the second application is a game application, and the third-party system is a game promotion platform system for promoting the game application. Specific description is provided in combination with the example shown in FIG. 8.

Figure 8:
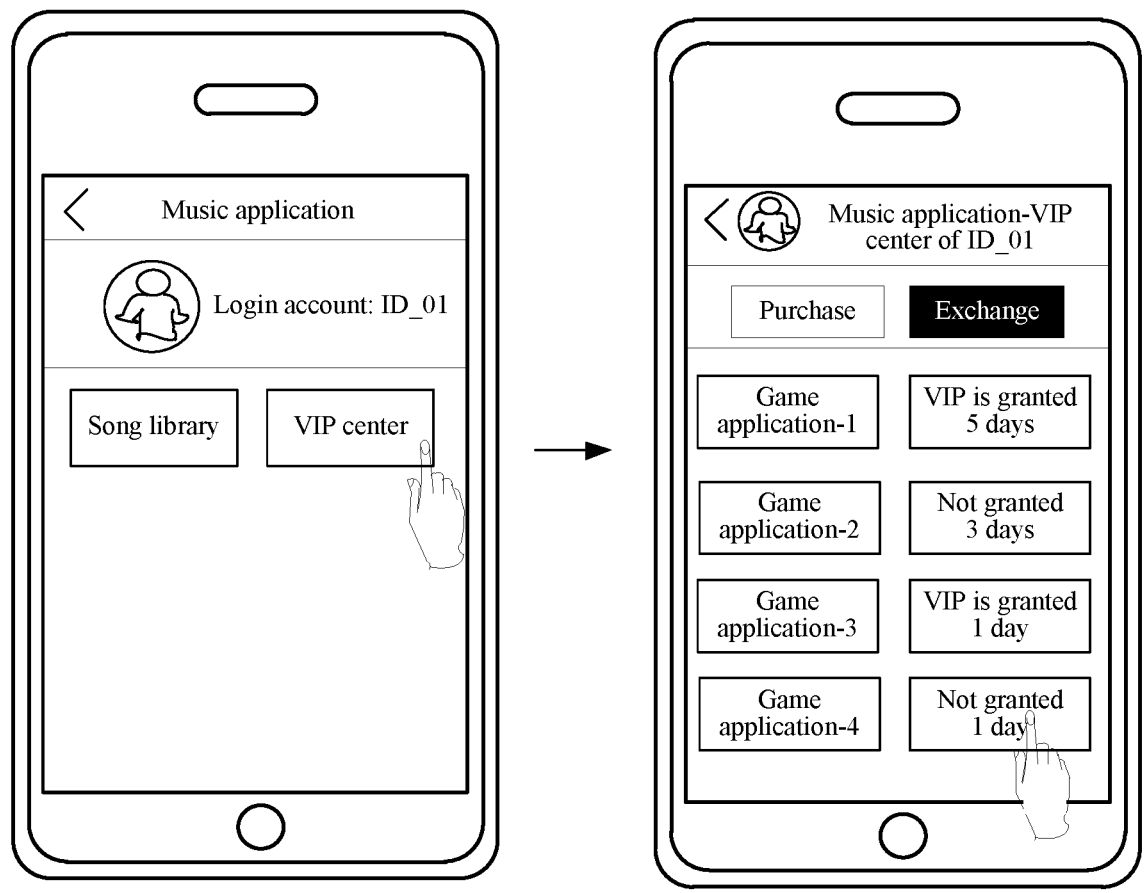
FIG. 8 is a schematic diagram of an optional method for acquiring a usage permission according to an embodiment of the present disclosure.

For example, a client of the music application run on a terminal A is currently logged into by using a login account ID_01. A page of the client of the music application is loaded, where the page includes a download port for downloading the game application, for example, a "VIP center" in the interface shown in the left side of FIG. 8. A click operation on the download port is acquired to enter a download interface, for example, the interface shown in the right side of FIG. 8. In this example, a quantity of days for which a membership permission is granted in the music application (for example, upgrading the account ID_01 to a VIP account) may be determined by selecting to transfer an asset. The method for transferring the asset may be clicking on "Purchase" in the interface shown in the right side of FIG. 8. Alternately, the quantity of days for which the membership permission is granted in the music application (for example, upgrading the account ID_01 to a VIP account) may also be determined by selecting to transfer an asset by an operator of the game application. The method for transferring the asset by the operator may be clicking on "Exchange" in the interface shown in the right side of FIG. 8. As shown in FIG. 8, different game applications may be selected to download in the "Exchange" interface of the VIP center. Assume that four game applications are currently displayed, respectively, a game application-1, a game application-2, a game application-3, and a game application-4.

Further, assuming that the membership permission is configured for the account ID_01 in the music application by downloading the game application-1 and the game application-3 (for example, upgrading the account ID_01 to a VIP account), as shown in FIG. 8, quantities of days for which VIP is granted, a game application for which the usage permission is not configured by means of downloading may further be selected. Assuming that click is performed for selecting to download the game application-4, the game promotion platform system receives download information sent by the page for downloading the game application-4, where the download information includes at least: a first device identifier (for example, an ID_A) of the first device (for example, the terminal A) in which the client of the music application is installed, the first account (for example, the ID_01) logging into the client of the music application, and an application identifier (for example, an ID-y4) of the downloaded game application. Further, the game promotion platform system authenticates the download information for downloading the game application-4, for example, determines whether game application-4 is activated. If the game application-4 is activated, the game promotion platform system may request the server of the music application to configure the membership permission for the account ID_01, for example, to upgrade the account ID_01 to a VIP account for one day.

Then, assuming that the game promotion platform system pays 1,000 yuan each time when the game application-4 is downloaded, the game promotion platform system may transfer the corresponding asset, that is, 1,000 yuan, to the server of the music application after the download and authentication process ends. Therefore, the game promotion platform system not only can count a quantity of downloads of the game application-4, but also can learn of that the game application-4 is downloaded in the music application, so that the game promotion platform system requests to the server of the music application to configure the corresponding usage permission for the account ID_01 that is currently logged.

That is, the account ID_01 logging into the client of the music application may not pay any price when acquiring the configured usage permission, and by means of exchange, the game promotion platform system pays for the configuration process instead of the game application. In addition, in this way, information promotion is also made for the game application, so as to increase the use volume of users and achieve a win-win effect.

It should be noted that, in this embodiment, the applications for downloading displayed in the page are not limited to one application type. That is, the download links herein are not limited to those for game applications, but also include those for other applications.

Embodiment 3

The application environment of the embodiment of the present disclosure may refer but not limited to the application environment in Embodiment 1, which is not described in detail in this embodiment. The embodiment of the present disclosure provides a specific example of application scenario for implementing the method for requesting for a usage permission and the method for acquiring the usage permission.

As an optional embodiment, description is provided by an example of requesting for configuring a usage permission in a video application by downloading a shopping application in the video application. That is, assume that the first application is a video application, the second application is a shopping application, and the third-party system is a shopping promotion platform system for promoting the shopping application. Specific description is provided in combination with the example shown in FIG. 9.

Figure 9:
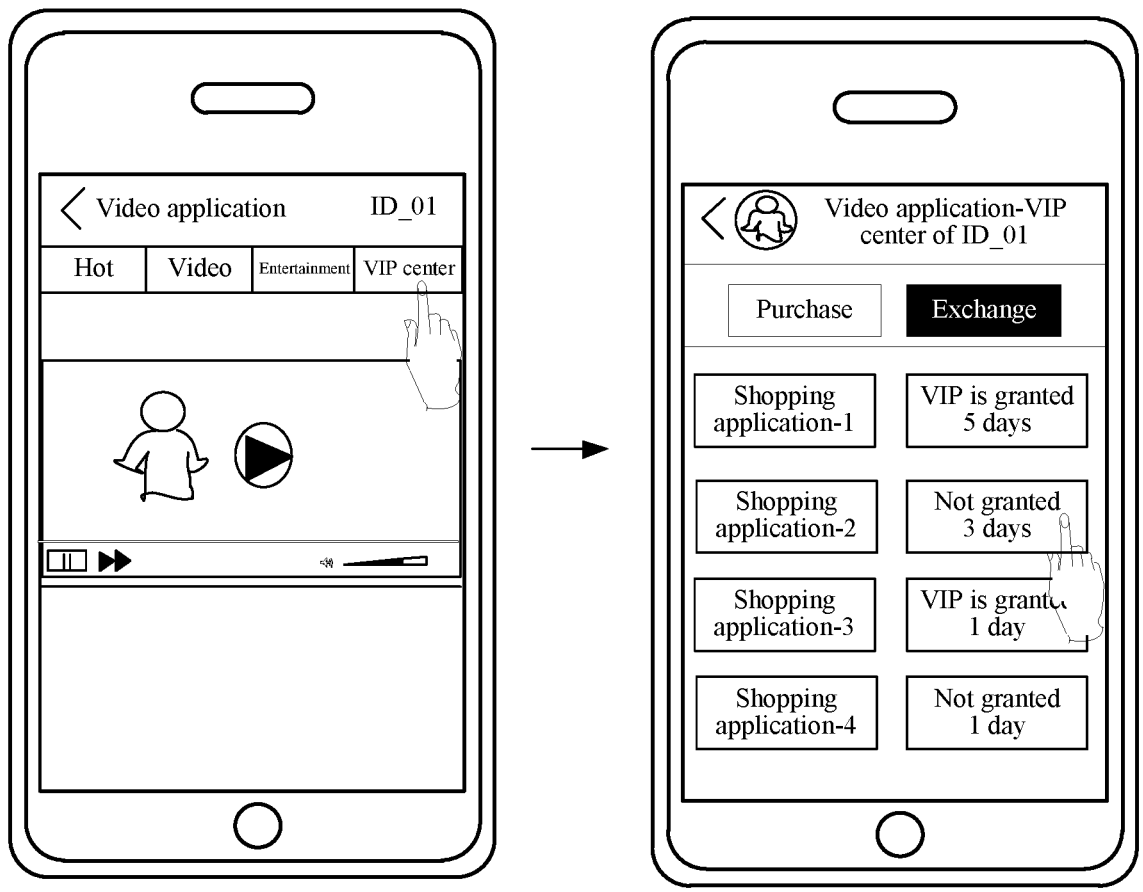
FIG. 9 is a schematic diagram of another optional method for acquiring a usage permission according to an embodiment of the present disclosure.

For example, a client of the video application run on a terminal A is currently logged into by using a login account ID_01. A page of the client of the video application is loaded, where the page includes a download port for downloading the shopping application (a "VIP center" in the interface shown in the left side of FIG. 9). A click operation on the download port is acquired to enter a download interface (the interface shown in the right side of FIG. 9). In this example, a quantity of days for which a membership permission is granted in the video application (for example, upgrading the account ID_01 to a VIP account) may be determined by selecting to transfer an asset. The method for transferring the asset may be clicking on "Purchase" in the interface shown in the right side of FIG. 9. Alternately, the quantity of days for which the membership permission is granted in the video application (for example, upgrading the account ID_01 to a VIP account) may also be determined by selecting to transfer an asset by an operator of the shopping application. The method for transferring the asset by the operator may be clicking on "Exchange" in the interface shown in the right side of FIG. 9. As shown in FIG. 9, different shopping applications may be selected to download in the "Exchange" interface of the VIP center. Assume that four shopping applications are currently displayed, respectively, a shopping application-1, a shopping application-2, a shopping application-3, and a shopping application-4.

Further, assuming that the membership permission is configured for the account ID_01 in the video application by downloading the shopping application-1 and the shopping application-3 (for example, upgrading the account ID_01 to a VIP account), as shown in FIG. 9, quantities of days for which VIP is granted, a shopping application for which the usage permission is not configured by means of downloading may further be selected. Assuming that click is performed for selecting to download the shopping application-2, the shopping promotion platform system receives download information sent by the page for downloading the shopping application-2, where the download information includes at least: a first device identifier (for example, an ID_A) of the first device (for example, the terminal A) in which the client of the video application is installed, the first account (for example, the ID_01) logging into the client of the video application, and an application identifier (for example, an ID-x2) of the downloaded shopping application. Further, the shopping promotion platform system authenticates the download information for downloading the shopping application-2, for example, determines whether shopping application-2 is activated. If the shopping application-2 is activated, the shopping promotion platform system may request the server of the video application to configure the membership permission for the account ID_01, for example, to upgrade the account ID_01 to a VIP account for three days.

Then, assuming that the shopping promotion platform system pays 2,000 yuan each time when the shopping application-2 is downloaded, the shopping promotion platform system may transfer the corresponding asset, that is, 2,000 yuan, to the server of the video application after the download and authentication process ends. Therefore, the shopping promotion platform system not only can count a quantity of downloads of the shopping application-2, but also can learn of that the shopping application-2 is downloaded in the video application, so that the shopping promotion platform system requests to the server of the video application to configure the corresponding usage permission for the account ID_01 that is currently logged.

That is, the account ID_01 logging into the client of the video application may not pay any price when acquiring the configured usage permission, and by means of exchange, the shopping promotion platform system pays for the configuration process instead of the shopping application. In addition, in this way, information promotion is also made for the shopping application, so as to increase the use volume of users and achieve a win-win effect.

It should be noted that, in this embodiment, the applications for downloading displayed in the page are not limited to one application type. That is, the download links herein are not limited to those for shopping applications, but also include those for other applications.

Embodiment 4

The embodiment of the present disclosure further provides a system for implementing the method for requesting for a usage permission and the method for acquiring the usage permission. The system includes:

1) a third-party system request server, configured to request a server of a first application to configure a usage permission for a first account logging into the first application, and further configured to transfer a corresponding resource to the server of the first application; and 2) an acquisition terminal, configured to acquire permission configuration information, the permission configuration information being used for instructing the server of the first application to configure the usage permission for the first account.

That is, the acquisition terminal running the first application records a page of the first application, where the page includes a download port of a second application and the first account logs into the first application; download information is sent to the third-party system request server in response to a click operation on the download port, and the third-party system request server receives the download information sent by the page, where the download information includes at least a terminal identifier of the acquisition terminal, the first account logging into the first application, and a second application identifier of the downloaded second application; and then the third-party system authenticates the download information and requests the server of the first application to configure the usage permission for the first account logging into the first application in response to the authentication. The acquisition terminal acquires the permission configuration information by means of the server of the first application, where the permission configuration information is used for instructing the server of the first application to configure the usage permission for the first account.

Optionally, in this embodiment, the system may further include but is not limited to: a server of the second application, configured to issue a download link to the third-party system request server, and further configured to transfer a corresponding resource to the third-party system request server.

Figure 10:
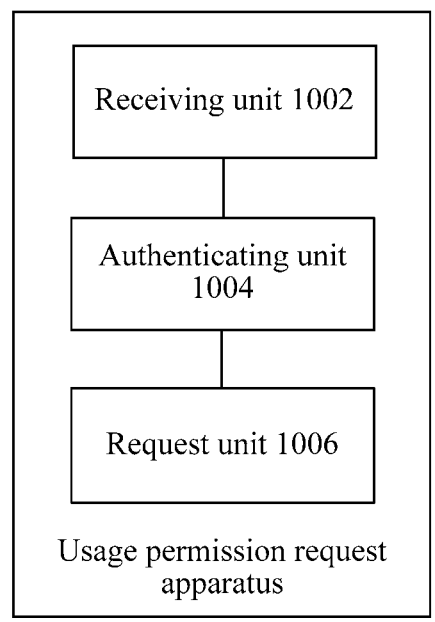
FIG. 10 is a schematic diagram of an optional apparatus for requesting for a usage permission according to an embodiment of the present disclosure.

Optionally, in this embodiment, the third-party system request server in the system may include but is not limited to an apparatus for requesting for a usage permission for implementing the method for requesting for a usage permission. As shown in FIG. 10, the apparatus includes:

a receiving unit 1002, configured to receive download information sent by means of a page of a first application, the download information at least including a download identifier, and the download identifier being used for indicating a first device identifier of a first device running the first application, a first account logging into the first application, and a second application identifier of a downloaded second application;

an authenticating unit 1004, configured to authenticate the download information; and a request unit 1006, configured to request a server of the first application to configure the usage permission for the first account in response to an authentication result and return such configuration to the first application running at the first device.

Optionally, in this embodiment, the apparatus for requesting for a usage permission may be used in but not limited to the process of requesting, by the third-party system, for a usage permission for applications of different application types. For example, the applications may be but not limited to a music application, a video application, a communication application, and the like. Optionally, in this embodiment, the third-party system is a third-party platform system relative to a user of the first device, an issuer or operator of the first application, and a source issuer or operator of the second application, and is a main body configured to configure information for the second application. For example, an advertisement platform system for advertising or a promotion platform system for promoting may advertise or promote application including the second application. Description is provided by an example of requesting for a usage permission in a music application, that is, by an example in which the first application is a music application and the second application is a game application. The third-party system receives download information sent by means of a page of the music application, where the download information includes at least: a first device identifier (for example, an ID_A) of the first device (for example, a terminal A) running the music application, a first account (for example, an ID_01) logging into the music application, and an application identifier (for example, an ID-x) of the downloaded game application, and then the third-party system authenticates the download information, and requests the server of the first application to configure the usage permission for the first account (for example, the ID_01) in response to the authentication. The above description is merely for exemplary, which is not limited in this embodiment.

It should be noted that, in this embodiment, the third-party system receives the download information sent by means of the page of the first application, where the download information includes at least the first device identifier of the first device running the first application, the first account logging into the first application, and the second application identifier of the downloaded second application, authenticates the download information, and requests the server of the first application to configure the usage permission for the first account in response to the authentication result. That is, after acquiring the download information sent by the page and authenticating the download information, the usage permission is configured for the first account logging into the first application in response to the authentication result. That is, a download source for downloading the second application is acquired from the third-party system, so as to perform a further subsequent operation on the first application as the download source. This embodiment provides a method for requesting, by the third-party system, for configuring the corresponding usage permission for the first account logging into the first application as the download source, so as to provide a corresponding excitation for the operation of downloading the second application by means of the first application. That is, a download port of the second application is provided in the first application, to expand a download channel for the second application, so as to further achieve the purpose of improving the download efficiency and usage efficiency of the second application.

Optionally, in this embodiment, the third-party system may request, when acquiring the authenticated download information, the server of the first application to configure the usage permission for the first account logging into the first application. The authentication manner may include but is not limited to: determining whether the downloaded application is activated. This embodiment is not limited to this authentication manner, but may further include other authentication manners used for indicating that this download is a valid operation, for example, determining whether the downloaded application is run, or the like. Further, the authentication process may include but is not limited to: determining whether the device identifier of the downloaded application matches the device identifier of the activated application, and determining whether the application identifier of the downloaded application matches the application identifier of the activated application. The description herein is merely for exemplary, which is not limited in this embodiment.

Optionally, in this embodiment, the authenticating, by the third-party system, the download information includes: receiving, by the third-party system, application activation information, where the application activation information at least includes a third application identifier used for indicating an activated third application and a second device identifier of a second device, where the third application is run on the second device; and determining whether the second device identifier matches the first device identifier and whether the second application identifier matches the third application identifier.

The request unit 1006 is further configured to request the server of the first application to configure the usage permission for the first account if the second device identifier matches the first device identifier and the second application identifier matches the third application identifier.

For example, description is provided by an example of requesting for a usage permission in a music application, that is, by an example in which the first application is a music application and the second application and the third application are game applications. The third-party system receives download information sent by means of a page of the music application, where the download information includes at least: a first device identifier (for example, an ID_A) of the first device (for example, a terminal A) running the music application, a first account (for example, an ID_01) logging into the music application, and an application identifier (for example, an ID-x) of the downloaded game application. The third-party system receives an application identifier (for example, an ID-y) used for indicating an activated game application and a second device identifier (for example, an ID_B) of the second device (for example, a terminal B) in which the activated game application is installed. The third-party system determines whether the second device identifier (for example, the ID_B) matches the first device identifier (for example, the ID_A) and whether the application identifier (for example, the ID-x) of the downloaded game application matches the application identifier (for example, the ID-y) of the activated game application. If the second device identifier (for example, the ID_B) matches the first device identifier (for example, the ID_A) and the application identifier (for example, the ID-x) of the downloaded game application matches the application identifier (for example, the ID-y) of the activated game application, the third-party system requests the server of the music application to configure the usage permission for the first account (for example, the ID_01). The above description is merely for exemplary, which is not limited in this embodiment.

Optionally, in this embodiment, before the receiving, by the third-party system, the download information sent by the page, the method further includes: issuing, by the third-party system, a download link of the second application to the first application by means of the server.

It should be noted that, in this embodiment, the second application may entrust, but not limited to, a downloading permission to the third-party system, so that the third-party system issues the download link of the second application to the first application by means of the server of the first application. That is, the third-party system as the third-party platform separately interacts with the first application and the second application, so as to configure the usage permission for the first account logging into the first application, thereby reducing interaction operations of the second application and improving the issuing efficiency of the download link of the second application.

Optionally, in this embodiment, the issuing, by the third-party system, a download link of the second application to the first application by means of the server of the first application may include but is not limited to: determining whether the first account logging into the first application is a predetermined account, where the corresponding usage permission is configured for the predetermined account; and issuing the download link of the second application to the first application when determining that the first account is not the predetermined account. That is, by determining whether the first account is the predetermined account for which the corresponding permission is configured, whether to issue the download link of the second application is determined, to ensure the validity of issuing of the download link of the second application, so as to avoid resource waste caused by unnecessary issuing.

Optionally, in this embodiment, the download information may be first sent to the server of the first application by the first application, and then sent to the third-party system by the server of the first application, or may be directly sent to the third-party system. This is not limited in this embodiment.

Optionally, in this embodiment, before the receiving, by the third-party system, the download information sent by the page, or after the requesting, by the third-party system, the server of the first application to configure the usage permission for the first account, the method further includes: transferring, by the third-party system, a resource corresponding to the usage permission to the server.

Optionally, in this embodiment, there is a predetermined association relationship between the usage permission configured for the first account and the resource transferred by the third-party system. Different degrees of usage permissions are configured corresponding to different degrees of transferred resources. For example, the resource is asset, and the usage permission is a quantity of days for which a membership permission is granted. Assume that the asset transferred by the third-party system to the server of the first application is K1, the usage permission configured for the first account logging into the first application by the server of the first application is N1 days for which the membership permission is granted. Still for example, assuming that the asset transferred by the third-party system to the server of the first application is K2, the usage permission configured for the first account logging into the first application by the server of the first application is N2 days for which the membership permission is granted. If K2>K1, N2>N1.

Optionally, in this embodiment, the resource corresponding to the usage permission may be, but not limited to, transferred by the server of the second application to the third-party system. That is, when configuring the usage permission for the first account, the first account logging into the first application does not need to pay any price, and by downloading the second application, the server of the second application transfers the corresponding resource to the usage permission configured for the first account. Therefore, the download volume and/or activation volume of the second application can be increased while reducing use costs needed for configuring the usage permission for the first account logging into the first application and enabling the second application to transfer a resource, so that the second application provides a corresponding excitation for a download operation of the first application, to further achieve the purpose of improving the download efficiency and usage efficiency of the second application.

Specific description is provided in combination with the following example. In step S302 to step S316 as shown in FIG. 3, a second application 306 informs a third-party system 308 of that a download link of the second application is going to be issued. After receiving the entrustment, the third-party system 308 issues the download link of the second application to a server 304 of a first application, so that the server 304 of the first application sends a page in which the download link of the second application is set to a client 302 of the first application for displaying. When receiving a download request in the process of displaying the page, the client 302 of the first application sends download information to the third-party system 308. Then, the third-party system 308 receives application activation information about that a third application 310 is activated, and determines, according to the received download information and application activation information, whether the second application matches the third application. If it is determined that the second application matches the third application, the third-party system 308 requests the server 304 of the first application to configure a usage permission for a first account logging into the client 302 of the first application. The server 304 of the first application configures the corresponding usage permission for the first account logging into the client 302 of the first application.

By the embodiment provided in this application, by acquiring the download information sent by means of the page of the first application, authenticating the download information, and then requesting for configuring the usage permission for the first account logging into the first application in response to the authentication, the first application requesting for downloading the second application is acquired by receiving and authenticating the download information. That is, a download source for downloading the second application is acquired from the third-party system, so as to perform a further subsequent operation on the first application as the download source. This embodiment provides a method for requesting, by the third-party system, for configuring the corresponding usage permission for the first account logging into the first application as the download source, so as to provide a corresponding excitation for the operation of downloading the second application by means of the first application. That is, a download port of the second application is provided in the first application, to expand a download channel for the second application, so as to further achieve the purpose of improving the download efficiency and usage efficiency of the second application. In addition, in this embodiment, the download source for downloading the second application can be acquired by acquiring the download information of the second application by means of the page of the first application, and by further requesting for configuring the corresponding usage permission for the first account logging into the first application as the download source, the problem in the existing technology of incapability of requesting for configuring the usage permission for the first application due to incapability of acquiring the first application for downloading the second application can be further overcome.

As an optional solution, the apparatus for requesting for a usage permission further includes:

1) an issuing unit, configured to issue the download link of the second application to the first application by means of the server.

It should be noted that, in this embodiment, the second application may entrust, but not limited to, a downloading permission to the third-party system. That is, the third-party system issues the download link of the second application to the first application by means of the server of the first application by notifying the third-party system to issue the download link of the second application. That is, the third-party system as the third-party platform separately interacts with the first application and the second application, to issue the download link of the second application to a plurality of first applications, so as to configure corresponding usage permissions for accounts logging into the different first applications, without separate interactions between the second application and the different first applications, thereby reducing interaction operations of the second application and improving the issuing efficiency of the download link of the second application.

Optionally, in this embodiment, the issuing, by the third-party system, a download link of the second application to the first application by means of the server of the first application may include but is not limited to: determining whether the first account logging into the first application is a predetermined account, where the corresponding usage permission is configured for the predetermined account; and issuing the download link of the second application to the first application when determining that the first account is not the predetermined account. That is, by determining whether the first account is the predetermined account for which the corresponding permission is configured, whether to issue the download link of the second application is determined, to ensure the validity of issuing of the download link of the second application, so as to further avoid resource waste caused by unnecessary issuing.

Optionally, in this embodiment, the issuing, by the third-party system, a download link of the second application to the first application by means of the server includes: setting, by the third-party system, the download link of the second application in the page loaded by the first application by means of the server, and sending an address of the page to the first application by means of the server of the first application.

Specific description is provided in combination with the example shown in FIG. 4. Assume that the third-party system issues download links of four second applications (as shown in the left side of FIG. 4) on the page loaded by the client of the first application, for example, respectively, a second application-1, a second application-2, a second application-3, and a second application-4. Corresponding usage permissions are configured for the second application-1 and the second application-3, and no corresponding usage permissions are configured for the second application-2 and the second application-4. Further, as shown in FIG. 4, assuming that a download operation instruction for downloading the second application-4 is received, the method may include but is not limited to jumping to a download page (as shown in the right side of FIG. 4), clicking on "Download immediately" for downloading the second application-4 which has been issued on the client of the first application but through which configuration of the usage permission for the first account has not be performed. Therefore, configuration of the usage permission for the first account logging into the client of the first application is implemented by downloading the second application-4. The above description is merely for exemplary, and the download operation may be, but not limited to, executed directly as shown in the left side of FIG. 4, which is not limited in this embodiment.

By the embodiment of the present disclosure, the third-party system issues the download link of the second application to the first application by means of the server, so as to increase the download volume of the second application by requesting for downloading the second application in the first application, to further achieve the purpose of improving the download efficiency and usage efficiency of the second application. Further, in this embodiment, by determining whether the first account is the predetermined account for which the corresponding usage permission is configured, whether to issue the download link of the second application is further determined, to ensure the validity of issuing, so as to avoid resource waste caused by unnecessary issuing.

As an optional solution, the issuing unit includes:

a setting module, configured to set the download link of the second application in the page by means of the server; and a sending module, configured to send an address of the page to the first application by means of the server.

Optionally, in this embodiment, the download link of the second application set in the page may be displayed as a download button, or may also be displayed as a download link. For example, the "Not configured" shown in the left side of FIG. 4 may be used as a download button for instructing to download the second application. That is, the second application may be downloaded directly by clicking on the "Not configured". Still for example, the "Not configured" shown in the left side of FIG. 4 may be used as a download link for linking to a download interface of the second application. That is, download is performed by clicking on the "Not configured" to jump to the download interface shown in the right side of FIG. 4. This is not limited in this embodiment.

Specific description is provided in combination with the following example. After receiving the entrustment of the second application-4, the third-party system sets the download link of the second application-4 in the page as shown in the left side of FIG. 4 by means of the server of the first application and sends an address of the page to the client of the first application for displaying, for example, the interface shown in the left side of FIG. 4.

By the embodiment provided in this application, the third-party system sets the download link of the second application in the page by means of the server and sends the address of the page to the first application by means of the server, so that the first application may display the download link of the second application, to increase the download volume of the second application by means of an expanded download channel of the second application, so as to further achieve the purpose of improving the download efficiency and usage efficiency of the second application.

As an optional solution, the download information includes: a first device identifier, a second application identifier, and a download identifier, where the download identifier is obtained by encoding the first account, the first device identifier, and the second application identifier. For example, the download information may include but is not limited to the information shown in table 2:

TABLE 2

First account ID logging into first application
First application ID
First device ID
National information
First device type
First device language
Second application ID Optionally, in this embodiment, the download identifier may be, but not limited to, acquired according to the md5 encoding technology. For example, download identifier=md5 (first account, first device identifier, and second application identifier). The description is merely for exemplary, and the download identifier may also be acquired in other manners in this embodiment, which is not limited in this embodiment.

For example, the acquired download information is as follows:

First account: 100011865
Second application ID: 56f9138040d4ec4ca3ebafec
First device ID: 7932c16a45db8d74.

By means of the md5 encoding technology, it can be obtained that the download identifier is:
f39253a094e9f00e388ad0a60ae24af6.

By the embodiment provided in this application, the download information sent by the page and received by the third-party system may include the first device identifier, the second application identifier, and the download identifier, where the download identifier may be, but not limited to, obtained by means of the md5 encoding technology. Therefore, the usage permission configured for the first account logging into the first application is acquired by using the download information.

As an optional solution, the apparatus further includes: a transfer unit, configured to transfer a resource corresponding to the second application to the server.

Optionally, in this embodiment, the transfer unit includes: a first transfer module, configured to transfer a fee corresponding to a quantity of times the second application is downloaded and/or activated to the server; and/or a second transfer module, configured to transfer a fee corresponding to the usage permission to the server.

That is, there is a predetermined association relationship between the usage permission configured for the first account and the resource transferred by the third-party system and/or the quantity of times for which the second application is downloaded and/or activated. The resource may be but not limited to the fee. The resource corresponding to the usage permission may be, but not limited to, transferred by the server of the second application to the third-party system. That is, when configuring the usage permission for the first account, the first account logging into the first application does not need to pay any price, and by downloading and activating the second application, the server of the second application transfers the corresponding resource (for example, the fee) to the usage permission configured for the first account.

It should be noted that, the server of the second application may transfer, in advance, all resources corresponding to a predetermined quantity of times for which the second application is downloaded and/or activated to the third-party system, or may also transfer a corresponding resource to the third-party system once each time when it is determined that the second application is downloaded and/or activated. The time point for transferring the resource of the second application is not limited in this embodiment. In addition, in this embodiment, the third-party system may also transfer the fee corresponding to the usage permission to the server of the first application.

Optionally, in this embodiment, the third-party system may also issue, but not limited to, download links to the server of the first application for a plurality of different second applications.

Optionally, in this embodiment, only downloading the second application, only authenticating (for example, activating) the second application, or downloading and authenticating (for example, activating) the second application may be but not limited to configured with different degrees of usage permissions. For example, assuming that the usage permission is a quantity of days for which the membership permission is granted (for example, upgrading the first account to a VIP account), in a case of only downloading the second application, the usage permission may be configured as using for one day, and in a case of downloading and authenticating (for example, activating) the second application, the usage permission may be configured as using for three days. The description herein is merely for exemplary, which is not limited in this embodiment.

Optionally, in this embodiment, when the second application provides resources of different degrees to the third-party system, the third-party system also transfers resources of different degrees to the server of the first application. The server of the first application may configure, but not limited to, usage permissions of different degrees for the first account. For example, for an operation of being downloaded and/or activated once, if the resource transferred by the second application-1 to the third-party system is K1 (that is, for an operation of being downloaded and/or activated once, the resource correspondingly transferred by the third-party system to the server of the first application is K1), the resource transferred by the second application-2 is K2 (that is, for an operation of being downloaded and/or activated once, the resource correspondingly transferred by the third-party system to the server of the first application is K2), where K1>K2, a usage permission Q1 configured by the server of the first application for the first account according to the operation that the second application-1 is downloaded and/or activated is greater than a usage permission Q2 configured by the server of the first application for the first account according to the operation that the second application-2 is downloaded and/or activated. Herein, Q1>Q2 may be understood as a quantity of the configured usage permission Q1 is greater than that of the configured usage permission Q2, for example, the quantity of days for which the membership permission is granted, or may also be understood as that a permission grade of the configured usage permission Q1 is higher than that of the configured usage permission Q2, for example, whether the permission grade is a golden member or a common member. The above description is merely for exemplary, which is not limited in this embodiment.

For example, the resource is an asset, and the usage permission is a quantity of days for which the membership permission is granted (for example, upgrading the first account to a VIP account). Assume that the third-party system issues download links of four second applications (as shown in FIG. 5) on the page of the first application, for example, respectively a second application-1, a second application-2, a second application-3, and a second application-4. Corresponding usage permissions are configured for the second application-1 and the second application-3, and no corresponding usage permissions are configured for the second application-2 and the second application-4.

Further, description is provided by an example of the second application-1 and the second application-3 for which the usage permissions have been configured. Assume that the second application-1 and the third-party system agree on transferring an asset of 50,000 yuan each time when the second application-1 is downloaded and activated, and the second application-3 and the third-party system agree on transferring an asset of 10,000 yuan each time when the second application-1 is downloaded and activated. As shown in FIG. 5, when the second application-1 is downloaded and activated, the third-party system may transfer the corresponding 50,000 yuan to the server of the first application, and the server of the first application may configure, according to the transferred asset, the usage permission as follows: granting the membership permission for five days for the first account (for example, upgrading the first account to a VIP account). When the second application-3 is downloaded and activated, the third-party system may transfer the corresponding 10,000 yuan to the server of the first application, and the server of the first application may configure, according to the transferred asset, the usage permission as follows: granting the membership permission for one day for the first account (for example, upgrading the first account to a VIP account).

Optionally, in this embodiment, the position of the download link of the second application in the displayed list may be configured, but not limited to, according to the transferred resources of different degrees. For example, a large quantity of the transferred resources indicates a front download position of the download link of the second application. This is not limited in this embodiment.

By the embodiment provided in this application, before the receiving, by the third-party system, the download information sent by means of the page of the first application, or after the requesting, by the third-party system, the server of the first application to configure the usage permission for the first account, the third-party system transfers the resource corresponding to the second application to the server. Therefore, the server of the second application transfers the corresponding resource to the usage permission configured for the first account when the third-party system acquires the second application downloaded and/or authenticated in the first application, to provide a corresponding excitation for a download operation of the first application while reducing use costs needed for configuring the usage permission for the first account logging into the first application and enabling the second application to transfer a resource, so as to expand the download channel of the second application and to further achieve the purpose of improving the download efficiency and usage efficiency of the second application.

Figure 11:
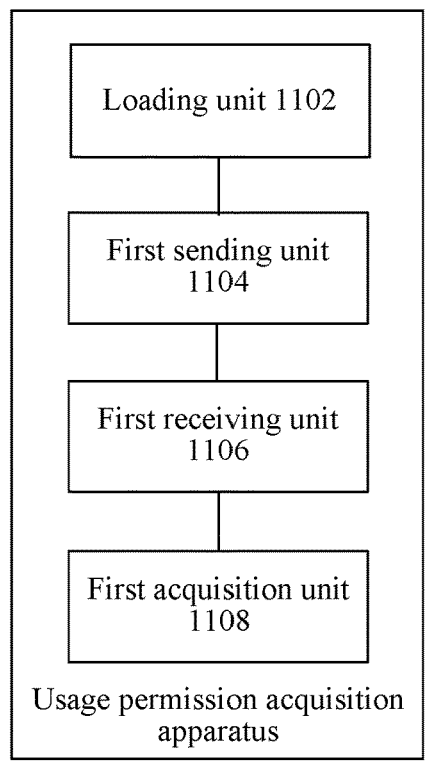
FIG. 11 is a schematic diagram of an optional apparatus for acquiring a usage permission according to an embodiment of the present disclosure.

Optionally, in this embodiment, the acquisition terminal in the system may include but is not limited to an apparatus for acquiring a usage permission for implementing the method for acquiring a usage permission. As shown in FIG. 11, the apparatus includes:

a loading unit 1102, configured to load a page of a first application, the page including a download port of a second application, the first application being logged into using a first account, and the first application being run on a first device;

a first sending unit 1104, configured to send download information to a third-party system in response to a click operation on the download port, the download information at least including a download identifier, and the download identifier being used for indicating a first device identifier of the first device, the first account, and a second application identifier of the downloaded second application;

a first receiving unit 1106, configured to receive an authentication result of the download information from the third-party system; and a first acquisition unit 1108, configured to acquire permission configuration information in response to the authentication result of the download information, the permission configuration information being used for instructing a server of the first application to configure the usage permission for the first account.

Optionally, in this embodiment, the apparatus for acquiring a usage permission may be used in, but not limited to, the process of acquiring a usage permission for clients of first applications of different types. For example, the applications may be but not limited to a music application, a video application, a communication application, and the like. The method may be applied to an application client, or may also be directly applied to an H5 page, which is not limited in this embodiment.

For example, description is provided by an example of acquiring a usage permission in a music application, that is, by an example in which the first application is a music application and the second application is a game application. Assume that the music application is run on the first device (for example, a terminal A) and is logged in using the first account (for example, an ID_01). A page of the music application is loaded, where the page includes the download port of the second application. The music application sends download information to the third-party system in response to a click operation on the download port, where the download information includes at least: a first device identifier (for example, an ID_A) of the first device (for example, the terminal A), a first account (for example, the ID_01) logging into the music application, and a second application identifier (for example, an ID-y) of the downloaded game application, and then acquires permission configuration information in response to the authentication of the download information by the third-party system, where the permission configuration information is used for instructing the server of the first application to configure the usage permission for the first account (for example, the ID_01).

It should be noted that, in this embodiment, the page of the first application into which the first account is logged is loaded, the page including the download port of the second application, and the first application being run on the first device; the download information is sent to the third-party system in response to the click operation on the download port, and the download information is sent to the third-party system by means of the page, download information at least be used for indicating: a first device identifier of the first device, the first account, and a second application identifier of the downloaded second application; and then the permission configuration information is acquired in response to the authentication of the download information by the third-party system, the permission configuration information being used for instructing the server of the first application to configure the usage permission for the first account. That is, by loading the page of the first application including the download port of the second application, the third-party system can learn of, after learning of that the second application is downloaded, that it is the first application that executes the download operation, so as to configure the usage permission for the first account logging into the first account, and enable the first account to acquire the corresponding usage permission. That is, the third-party system configures the corresponding usage permission for the first account logging into the first application as the download source, so as to provide a corresponding excitation for the operation of downloading the second application by means of the first application. That is, a download port of the second application is provided in the first application, to expand a download channel for the second application, so as to further achieve the purpose of improving the download efficiency and usage efficiency of the second application.

Optionally, in this embodiment, operations performed by the server of the first application may include but are not limited to: determining whether the first account is a predetermined account, where the corresponding usage permission is configured for the predetermined account; and sending an address of the page in which the download link of the second application is set when determining that the first account is not the predetermined account. That is, the server of the first application determines whether the first account is the predetermined account for which the corresponding permission is configured, so as to determine whether to send the address of the page in which the download link of the second application is set, to ensure the validity of issuing of the download link of the second application, so as to avoid resource waste caused by unnecessary issuing.

Optionally, in this embodiment, after transferring the resource corresponding to the usage permission to the server of the first application, the third-party system may further but not limited to update and display the acquired usage permission.

By the embodiment provided in this application, by loading the page of the first application including the download port of the second application, the third-party system can learn of, after learning of that the second application is downloaded, that it is the first application that executes the download operation, so as to configure the usage permission for the first account logging into the first account, and enable the first account to acquire the corresponding usage permission. That is, the third-party system configures the corresponding usage permission for the first account logging into the first application as the download source, so as to provide a corresponding excitation for the operation of downloading the second application by means of the first application. That is, a download port of the second application is provided in the first application, to expand a download channel for the second application, so as to further achieve the purpose of improving the download efficiency and usage efficiency of the second application.

As an optional solution, the apparatus further includes:
a second receiving unit, configured to receive a page loading instruction before the loading a page of a first application;
a second sending unit, configured to send a page loading request to the server; and
a second acquisition unit, configured to acquire the page from the server.

By the embodiment provided in this application, after receiving the page loading instruction, the page loading request may be sent to the server of the first application, so as to acquire the page in which the download link of the second application is set from the server of the first application, thereby flexibly displaying the download link of the second application to be downloaded by loading the page, increasing the download volume of the second application by expanding a download channel of the second application, and further improving the download efficiency and usage efficiency of the second application.

As an optional solution, the page loading request carries the first account, where the second acquisition unit includes:
an acquisition module, configured to acquire the page from the server when the first account does not have the usage permission.

Optionally, in this embodiment, if the first account has the usage permission, another page is acquired from the server after sending the page loading request to the server.

By the embodiment of this application, instead of uniform loading, whether to load the page in which the download link of the second application is set can be further determined according to whether the first account has the usage permission, to further ensure the validity of issuing of the download link of the second application, so as to avoid resource waste caused by unnecessary issuing.

Figure 12:
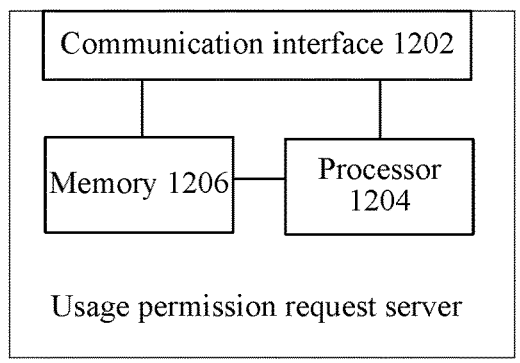
FIG. 12 is a schematic diagram of an optional server for requesting for a usage permission according to an embodiment of the present disclosure.

Optionally, in this embodiment, as shown in FIG. 12, the third-party system request server may include but is not limited to the following components:
a communication interface 1202, configured to receive download information sent by means of a page of a first application, and further configured to request a server of the first application to configure a usage permission for a first account in response to an authentication;

a processor 1204, connected to the communication interface 1202, and configured to authenticate the download information; and a memory 1206, connected to the communication interface 1202 and the processor 1204, and configured to store the download information.

Figure 13:
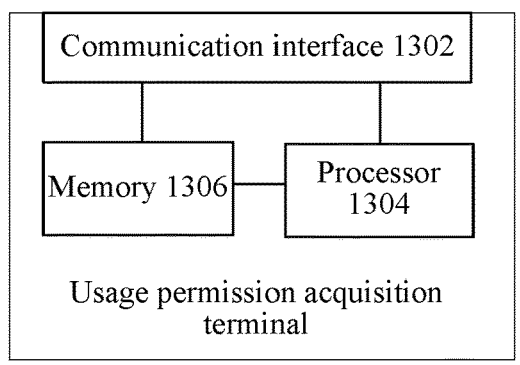
FIG. 13 is a schematic diagram of an optional acquiring terminal for a usage permission according to an embodiment of the present disclosure.

Optionally, in this embodiment, as shown in FIG. 13, the acquisition terminal may include but is not limited to the following components:

a communication interface 1302, configured to acquire a page of a first application to be loaded, further configured to send download information to a third-party system in response to a click operation on a download port, and further configured to acquire permission configuration information in response to authentication of the download information by the third-party system;

a processor 1304, connected to the communication interface 1302, and configured to configure a usage permission according to the permission configuration information; and a memory 1306, connected to the communication interface 1302 and the processor 1304, and configured to store an interface of the first application and the permission configuration information.

Optionally, for a specific example in this embodiment, refer to the examples described in the foregoing embodiments, and details are not described herein again in this embodiment.

Embodiment 5

An embodiment of the present disclosure further provides a storage medium. Optionally, in this embodiment, the foregoing storage medium may be located in at least one of multiple network devices in a network.

Optionally, in this embodiment, the storage medium is configured to store program code used to execute the following steps:

S1: Receive download information sent by means of a page of a first application, the download information at least including a download identifier, and the download identifier being used for indicating a first device identifier of a first device running the first application, a first account logging into the first application, and a second application identifier of a downloaded second application.

S2: Authenticate the download information.

S3: Request a server of the first application to configure a usage permission for the first account in response to an authentication result.

Optionally, in this embodiment, the storage medium may further be configured to store program code used to execute the following steps:

S1: Load a page of a first application, the page including a download port of a second application, the first application being logged into using a first account, and the first application being run on a first device.

S2: Send download information to a third-party system in response to a click operation on the download port, the download information at least including a download identifier, and the download identifier being used for indicating a first device identifier of the first device, the first account, and a second application identifier of the downloaded second application.

S3: Acquire permission configuration information in response to the authentication of the download information, the permission configuration information being used for instructing a server of the first application to configure the usage permission for the first account.

Optionally, in this embodiment, the foregoing storage medium may include but is not limited to: any medium that can store program code, such as a USB flash drive, a read-only memory (ROM), a random access memory (RAM), a removable hard disk, a magnetic disk, or an optical disc.

Optionally, for a specific example in this embodiment, refer to the examples described in Embodiment 1 and Embodiment 2, and details are not described herein again in this embodiment.

The sequence numbers of the preceding embodiments of the present disclosure are merely for description purpose but do not indicate the preference of the embodiments.

When the integrated unit in the foregoing embodiment is implemented in a form of a software functional module and sold or used as an independent product, the integrated unit may be stored in the foregoing computer-readable storage medium. Based on such an understanding, the technical solutions of the present disclosure essentially, or the part contributing to the prior art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of the present disclosure.

In the foregoing embodiments of the present disclosure, descriptions of the embodiments have different emphases, and as for parts that are not described in detail in one embodiment, reference can be made to the relevant description of the other embodiments.

In the several embodiments provided in this application, it should be understood that the disclosed client may be implemented in other manners. The described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

The above descriptions are merely preferred embodiments of the present disclosure, and it should be noted that, a person of ordinary skill in the art may make various improvements and refinements without departing from the spirit of the present disclosure. All such modifications and refinements should also be intended to be covered by the present disclosure.

What is claimed is:

1. A method for requesting for a usage permission performed at a computer acting as a third-party system, the computer having one or more processors and memory storing a plurality of programs to be executed by the one or more processors, the method comprising:
   receiving, by the third-party system, download information sent by means of a page of a first application, the download information at least comprising a download identifier, and the download identifier being used for indicating a first device identifier of a first device running the first application, a first account logging into the first application, and a second application identifier of a downloaded second application;
   authenticating, by the third-party system, the download information; and
   requesting, by the third-party system, a server of the first application to configure the usage permission for the first account in response to an authentication result and return such configuration to the first application running at the first device.

2. The method according to claim 1, wherein the authenticating, by the third-party system, the download information comprises:
   receiving, by the third-party system, application activation information, wherein the application activation information at least comprises a third application identifier used for indicating an activated third application and a second device identifier of a second device, wherein the third application is run on the second device; and
   determining, by the third-party system, whether the second device identifier matches the first device identifier and whether the second application identifier matches the third application identifier; and
   the requesting, by the third-party system, a server of the first application to configure the usage permission for the first account in response to an authentication result comprises: requesting, by the third-party system, the server of the first application to configure the usage permission for the first account if the second device identifier matches the first device identifier and the second application identifier matches the third application identifier.

3. The method according to claim 1, wherein before the receiving, by a third-party system, download information sent by means of a page of a first application, the method further comprises:
   issuing, by the third-party system, a download link of the second application in the first application by means of the server.

4. The method according to claim 3, wherein the issuing, by the third-party system, a download link of the second application to the first application by means of the server comprises:
   setting, by the third-party system, the download link of the second application in the page by means of the server, and sending an address of the page to the first application by means of the server.

5. The method according to claim 1, wherein the download information further comprises the first device identifier and the second application identifier, wherein the download identifier is obtained by encoding the first account, the first device identifier, and the second application identifier.

6. The method according to claim 1, wherein before the receiving, by a third-party system, download information sent by means of a page of a first application, or after the requesting, by the third-party system, a server of the first application to configure the usage permission for the first account, the method further comprises: transferring, by the third-party system, a resource corresponding to the second application to the server.

7. The method according to claim 6, wherein the transferring, by the third-party system, a resource corresponding to the second application to the server comprises:
   transferring, by the third-party system, a fee corresponding to a quantity of times the second application is downloaded and/or activated to the server; and/or
   transferring, by the third-party system a fee corresponding to the usage permission to the server.

8. A computer acting as a third-party system for requesting for a usage permission, the computer having one or more processors, memory coupled to the one or more processors, and a plurality of programs stored in the memory that, when executed by the one or more processors, cause the third-party system to perform the following operations:
   receiving, by the third-party system, download information sent by means of a page of a first application, the download information at least comprising a download identifier, and the download identifier being used for indicating a first device identifier of a first device running the first application, a first account logging into the first application, and a second application identifier of a downloaded second application;
   authenticating, by the third-party system, the download information; and
   requesting, by the third-party system, a server of the first application to configure the usage permission for the first account in response to an authentication result and return such configuration to the first application running at the first device.

9. The computer according to claim 8, wherein the authenticating, by the third-party system, the download information comprises:
   receiving, by the third-party system, application activation information, wherein the application activation information at least comprises a third application identifier used for indicating an activated third application and a second device identifier of a second device, wherein the third application is run on the second device; and
   determining, by the third-party system, whether the second device identifier matches the first device identifier and whether the second application identifier matches the third application identifier; and
   the requesting, by the third-party system, a server of the first application to configure the usage permission for the first account in response to an authentication result comprises: requesting, by the third-party system, the server of the first application to configure the usage permission for the first account if the second device identifier matches the first device identifier and the second application identifier matches the third application identifier.

10. The computer according to claim 8, wherein before the receiving, by a third-party system, download information sent by means of a page of a first application, the method further comprises:
   issuing, by the third-party system, a download link of the second application in the first application by means of the server.

11. The computer according to claim 10, wherein the issuing, by the third-party system, a download link of the second application to the first application by means of the server comprises:
  setting, by the third-party system, the download link of the second application in the page by means of the server, and sending an address of the page to the first application by means of the server.

12. The computer according to claim 8, wherein the download information further comprises the first device identifier and the second application identifier, wherein the download identifier is obtained by encoding the first account, the first device identifier, and the second application identifier.

13. The computer according to claim 8, wherein before the receiving, by a third-party system, download information sent by means of a page of a first application, or after the requesting, by the third-party system, a server of the first application to configure the usage permission for the first account, the method further comprises: transferring, by the third-party system, a resource corresponding to the second application to the server.

14. The computer according to claim 13, wherein the transferring, by the third-party system, a resource corresponding to the second application to the server comprises:
  transferring, by the third-party system, a fee corresponding to a quantity of times the second application is downloaded and/or activated to the server; and/or
  transferring, by the third-party system a fee corresponding to the usage permission to the server.

15. A non-transitory computer readable storage medium storing a plurality of programs in connection with a computer having one or more processors and acting as a third-party system for requesting for a usage permission, wherein the plurality of programs, when executed by the one or more processors, cause the third-party system to perform the following operations:
  receiving, by the third-party system, download information sent by means of a page of a first application, the download information at least comprising a download identifier, and the download identifier being used for indicating a first device identifier of a first device running the first application, a first account logging into the first application, and a second application identifier of a downloaded second application;
  authenticating, by the third-party system, the download information; and
  requesting, by the third-party system, a server of the first application to configure the usage permission for the first account in response to an authentication result and return such configuration to the first application running at the first device.

16. The non-transitory computer readable storage medium according to claim 15, wherein the authenticating, by the third-party system, the download information comprises:
  receiving, by the third-party system, application activation information, wherein the application activation information at least comprises a third application identifier used for indicating an activated third application and a second device identifier of a second device, wherein the third application is run on the second device; and
  determining, by the third-party system, whether the second device identifier matches the first device identifier and whether the second application identifier matches the third application identifier; and
  the requesting, by the third-party system, a server of the first application to configure the usage permission for the first account in response to an authentication result comprises: requesting, by the third-party system, the server of the first application to configure the usage permission for the first account if the second device identifier matches the first device identifier and the second application identifier matches the third application identifier.

17. The non-transitory computer readable storage medium according to claim 15, wherein before the receiving, by a third-party system, download information sent by means of a page of a first application, the method further comprises:
  issuing, by the third-party system, a download link of the second application in the first application by means of the server.

18. The non-transitory computer readable storage medium according to claim 17, wherein the issuing, by the third-party system, a download link of the second application to the first application by means of the server comprises:
  setting, by the third-party system, the download link of the second application in the page by means of the server, and sending an address of the page to the first application by means of the server.

19. The non-transitory computer readable storage medium according to claim 15, wherein the download information further comprises the first device identifier and the second application identifier, wherein the download identifier is obtained by encoding the first account, the first device identifier, and the second application identifier.

20. The non-transitory computer readable storage medium according to claim 15, wherein before the receiving, by a third-party system, download information sent by means of a page of a first application, or after the requesting, by the third-party system, a server of the first application to configure the usage permission for the first account, the method further comprises: transferring, by the third-party system, a resource corresponding to the second application to the server.

* * * * *